(12) United States Patent
Kihara et al.

(10) Patent No.: US 11,529,763 B2
(45) Date of Patent: Dec. 20, 2022

(54) LASER-WELDED BODY AND PRODUCTION METHOD THEREFOR

(71) Applicant: ORIENT CHEMICAL INDUSTRIES CO., LTD., Osaka (JP)

(72) Inventors: Tetsuji Kihara, Neyagawa (JP); Satoshi Yamamoto, Neyagawa (JP)

(73) Assignee: ORIENT CHEMICAL INDUSTRIES CO., LTD., Osaka (JP)

(*) Notice: Subject to any disclaimer, the term of this patent is extended or adjusted under 35 U.S.C. 154(b) by 28 days.

(21) Appl. No.: 16/699,234

(22) Filed: Nov. 29, 2019

(65) Prior Publication Data
US 2020/0114586 A1    Apr. 16, 2020

Related U.S. Application Data

(63) Continuation-in-part of application No. PCT/JP2018/016443, filed on Apr. 23, 2018.

(30) Foreign Application Priority Data

May 30, 2017   (JP) .............................. JP2017-106386

(51) Int. Cl.
*B29C 65/16*    (2006.01)
*B32B 27/08*    (2006.01)
(Continued)

(52) U.S. Cl.
CPC ...... *B29C 65/1677* (2013.01); *B29C 66/1142* (2013.01); *B32B 27/08* (2013.01);
(Continued)

(58) Field of Classification Search
CPC .. B29C 65/1677–1683; B29C 66/1142; B29K 2105/0005; B29K 2105/0047;
(Continued)

(56) References Cited

U.S. PATENT DOCUMENTS

| 4,636,609 A | 1/1987 | Nakamata |
| 6,395,809 B1 | 5/2002 | Hayashi et al. |

(Continued)

FOREIGN PATENT DOCUMENTS

| JP | S62-49850 B2 | 10/1987 |
| JP | 2001-011055 A | 1/2001 |

(Continued)

OTHER PUBLICATIONS

Kihara et al, "JP2007112126A (English Translation)," May 10, 2007, JPO, pp. 1-48 (Year: 2007).*

(Continued)

*Primary Examiner* — Travis M Figg
*Assistant Examiner* — Ethan Weydemeyer
(74) *Attorney, Agent, or Firm* — Oliff PLC

(57) ABSTRACT

A laser-welded body includes at least three of resin members, which contain a thermoplastic resin including: a first resin member which is a laser-irradiated subject, has an absorbance $a_1$ of 0.01 to 0.12; a second resin member which has an absorbance $a_2$ of 0.1 to 0.9 and includes a butted part where ends of one or more resin members are brought into contact with each other; and a third resin member which has an absorbance $a_3$ of 0.2 to 3.8, and the absorbances $a_2$, $a_3$ exhibited by the second resin member and the third resin member are attributed to the inclusion of nigrosine as a laser beam absorbent therein, and the resin members are overlapped in the above mentioned to form contacted parts at these interfaces, at least a part of the butted part and/or the contacted parts are laser-welded.

12 Claims, 3 Drawing Sheets
(1 of 3 Drawing Sheet(s) Filed in Color)

(51) Int. Cl.
*B32B 27/18* (2006.01)
*B29C 65/00* (2006.01)
*B29K 105/00* (2006.01)

(52) U.S. Cl.
CPC ...... *B32B 27/18* (2013.01); *B29K 2105/0005* (2013.01); *B32B 2307/20* (2013.01)

(58) Field of Classification Search
CPC ... B29K 2105/005; B32B 27/08; B32B 27/18; B32B 2307/20
See application file for complete search history.

(56) References Cited

U.S. PATENT DOCUMENTS

| | | |
|---|---|---|
| 2005/0251986 A1 | 11/2005 | Katayama et al. |
| 2006/0175004 A1 | 8/2006 | Kurosaki et al. |
| 2007/0065659 A1 | 3/2007 | Kihara et al. |
| 2009/0136717 A1 | 5/2009 | Kihara et al. |
| 2009/0291244 A1 | 11/2009 | Kihara et al. |
| 2010/0186886 A1 | 7/2010 | Kihara et al. |

FOREIGN PATENT DOCUMENTS

| | | |
|---|---|---|
| JP | 2004-351730 A | 12/2004 |
| JP | 2007-112126 A | 5/2007 |
| JP | 2007-112127 A | 5/2007 |
| JP | 2007-231088 A | 9/2007 |
| WO | 2003/39843 A1 | 5/2003 |
| WO | 2004/005013 A1 | 1/2004 |
| WO | 2007/034978 A1 | 3/2007 |

OTHER PUBLICATIONS

Jun. 19, 2018 Search Report issued in International Patent Application No. PCT/JP2018/016443.

Dec. 3, 2019 International Preliminary Report on Patentability issued in International Patent Application No. PCT/JP2018/016443.

* cited by examiner

LASER-WELDED BODY AND PRODUCTION METHOD THEREFOR

TECHNICAL FIELD

The present invention relates to a laser-welded body in which a resin member having a butted part by butting ends thereof and a plurality of another resin members which overlaps the resin member so as to sandwich the butted part are simultaneously laser-welded to integrate these and a production method therefor.

BACKGROUND OF THE ART

Recently, lightweight thermoplastic resin products are often employed as parts for vehicles such as automobiles and railways, and structural components for the field of electronic and electrical devices instead of employing metals. As a thermoplastic resin used for the structural components, for example, a polyester resin, a polyamide resin, a polycarbonate resin and the like are exemplified. Among these, the polyester resin which is typified by a polybutylene terephthalate and a polyethylene terephthalate and the polyamide resin have an excellent mechanical physicality, electrical property, heat resistance, dimensional stability and other physical and chemical properties. These resins are widely used for parts for vehicles, parts for electronic and electrical devices and parts for precision instruments.

In various utilities, the polybutylene terephthalate resin is applied to electrical components (e.g. a control unit) for the automobiles and products for sealing electrical circuits such as a variety of sensor parts and connector parts. For example, the polyamide resin is applied to products having a hollow part such as an intake manifold. In the products for sealing the electrical circuits and the products having the hollow part, sealing an inside by bonding multiple parts may be needed. Various welding and sealing technologies are used. For example, bonding technology using an adhesive, and bonding technology using welding such as vibration welding method, ultrasonic welding method, hot plate welding method, injection welding method and laser welding method are employed.

According to the bonding using the adhesive, a waste of time is occurred because a long period of time is needed in order to cure the adhesive. Additionally, an environment is polluted due to an organic solvent included in the adhesive. According to the bonding using the ultrasonic welding method and the hot plate welding method, a welding process is cumbersome because a post-process is needed due to damage of products by vibration and heat and producing abrasion debris and burrs. Further, according to the injection welding method, a cost is high because a special mold and molding machine may be needed. Additionally, the injection welding method is unsuited for welding low-fluidic materials.

The laser welding method is performed as follows. A laser-transmissible resin member is overlapped a laser-absorptive resin member. The laser beam which is emitted from a side of the laser-transmissible resin member passes through it. The laser beam reaches the laser-absorptive resin member and is absorbed into it. The laser-absorptive resin member generates heat. Both resin members are thermally fused, welded and bonded.

The laser welding method has advantages as follows. Welding resin members can be performed simply by local laser beam irradiation to a region to be bonded. Thermal influence on a neighborhood except for a welded part is little because exotherm is locally generated. No vibration is generated. Welding fine parts or rein members having three-dimensionally complicated structures can be performed. Reproducibility is excellent. High airtightness can be maintained. Bonding strength is high. A boundary line of a welding position is visually inconspicuous. No dust is generated.

According to the laser welding method, the rein members can be rigidly bonded by firmly welding these. In addition, equal or stronger bonding strength is achieved as compared with the other methods, for example, method by clamping with a clamp (a bolt, a screw, a clip and so on), by adhering by an adhesive material, by vibration welding, by the ultrasonic welding and so on. According to the laser welding method also achieves labor saving, improvement of productivity, lowering of production costs and so on because it is capable of little vibratory and minimizing thermal influence. Accordingly, in the automobile industry, the electric industry or the electronic industry, the laser welding method is suitable for bonding functional parts or electronic parts which should avoid the vibratory or thermal influence thereon. Also the laser welding method can be adapted for bonding resin parts having a complicated shape.

As a technology relating to the laser welding method, a laser welding method is disclosed in Patent Document 1. In the method, in order to weld two resin members, a laser-absorptive resin member to which carbon black absorbing a laser beam is added and a laser-transmissible resin member are overlapped, and then the laser beam radiated from a side of the laser-transmissible resin member is applied thereto. Both resin members are bonded by the welding.

The Patent Document 2 discloses another laser welding method. In the method, thermoplastic resin members A and B and a heat-releasing material C having an infrared ray-transmissible part are in contact in order of C/A/B, and then these resin members are irradiated with an infrared ray which radiates from a side of the heat-releasing material C. According to the method, the thermoplastic members A and B may be made from a same thermoplastic resin. However, in the method, the special heat-releasing material C must be used in order to adjust the exotherm at the time of laser-welding, which causes complex processes in the laser welding method.

Patent Document 3 discloses another laser welding method. In the method, joining flange parts, which are preliminarily formed as a joint flap for respectively welding laser-transmissible resin member and the laser-absorptive resin member, are butted. In order to temporarily weld the both resin members, a laser beam which radiates from a side of the joining flange part of the laser-transmissible resin member is applied thereto. Then, in order to unify both resin members, essential welding is performed by irradiating the joining flange parts with the laser beam. In this laser welding method, many man-hours are needed due to a plurality of laser radiation processes, which elongate a bonding process for welding resin members. Therefore a manufacturing cost of resin parts remains high.

PRIOR ART DOCUMENT

Patent Document

[Patent Document 1] Japanese Patent Publication of Provisionally Allowed Application No. S62-049850 B2

[Patent Document 2] International Application Publication No. WO03/039843 A1

[Patent Document 3] Japanese Patent Application Publication No. 2004-351730 A

SUMMARY OF THE INVENTION

Problems to be Solved by the Invention

The present invention was made in view of solving the above described problems, and its object is to provide a laser-welded body which bonds and integrates a plurality of resin members prepared through a simple method by a single laser welding process without destroying resin characteristics and which has excellent bonding strength between the resin members and a production method therefor.

Means for Solving Problems

The inventors of the present invention found out as follows. A great and deep melting phenomenon is occurred by applying a laser beam to multilayer resin members in which a plurality of resin members are overlapped so as to sandwich a laser-weakly-absorptive resin member which is adjusted to a specific absorbance exhibiting absorption and transmission of the laser beam. The melting phenomenon is occurred at a welded part including the laser-weakly-absorptive resin member. Thereby the inventors have completed the present invention of obtaining the laser-welded body which more strongly bonds the resin members as compared with a conventional laser welding method of welding a laser-transmissible resin member and a laser-absorptive resin member.

A laser-welded body of the present invention developed to achieve the objects described above comprises at least three of resin members, which contain a thermoplastic resin, comprising: a first resin member which is a laser-irradiated subject, has an absorbance $a_1$ of 0.01 to 0.12; a second resin member which has an absorbance $a_2$ of 0.1 to 0.9 and includes a butted part where ends of one or more resin members are brought into contact with each other; and a third resin member which has an absorbance $a_3$ of 0.2 to 3.8, and the absorbances $a_2$, $a_3$ exhibited by the second resin member and the third resin member are attributed to the inclusion of nigrosine as a laser beam absorbent therein, the resin members are overlapped in the order mentioned to form contacted parts at these interfaces, at least a part of the butted part and/or the contacted parts are laser-welded, the thermoplastic resin is at least one selected from the group consisting of a polyamide rein, a polycarbonate resin, a polyphenylene sulfide resin, a polyethylene terephthalate resin, a polybutylene terephthalate resin and a polypropylene resin, and tensile strength is at least 700 N.

In the laser-welded body, volume resistivity of the nigrosine is $3.0 \times 10^9$ to $1.0 \times 10^{11}$ Ω·cm.

In the laser-welded body, the nigrosine may be nigrosine sulfate, and concentration of the nigrosine sulfate may be 0.3 to 5% by mass.

In the laser-welded body, a melt flow rate of the second resin member may be 11 to 30 g/10 minutes.

In the laser-welded body, the second resin member may have two of the resin members having absorbances $a_{2f}$ and $a_{2s}$ respectively, and an absorbance ratio $a_{2f}/a_{2s}$ of the absorbance $a_{2f}$ to the absorbance $a_{2s}$ may be 0.3 to 1.2.

In the laser-welded body, the absorbances $a_1$ may be 0.01 to 0.09.

In the laser-welded body, the first resin member may contain an anthraquinone dye.

A production method for a laser-welded body of the present invention comprises verlapping at least three of a first resin member having an absorbance $a_1$ of 0.01 to 0.12, a second resin member having a butted part where ends of one or more resin members which have an absorbance $a_2$ of 0.1 to 0.9 are brought into contact with each other and a third resin member having an absorbance $a_3$ of 0.2 to 3.8 to form contacted parts at these interfaces and irradiating the butted part and/or the contacted parts with a laser beam from a side of the first resin member to weld at least a part of the butted part and/or the contacted parts, wherein a thermoplastic resin which is contained in the first resin member, the second resin member and the third resin member is at least one selected from the group consisting of a polyamide rein, a polycarbonate resin, a polyphenylene sulfide resin, a polyethylene terephthalate resin, a polybutylene terephthalate resin and a polypropylene resin, and the absorbances $a_2$, $a_3$ exhibited by the second resin member and the third resin member are attributed to the inclusion of nigrosine as a laser beam absorbent therein.

Effects of the Invention

In the laser-welded body of the present invention, the laser-transmissible resin member as the first resin member, the laser-weakly-absorptive resin member as the second resin member having the butted part and the laser-absorptive resin member as the third resin member are overlapped and laser-welded. The laser-welded body is strongly bonded at the butted part and/or between the resin members because a welded part is suitably expanded from an origination point which is the butted part of the second resin member exhibiting high fluidity by thermal fusing when receiving the laser beam due to containing the nigrosine.

In the laser-welded body, the butted part and the contacted parts as regions which should be bonded do not appear at a surface layer because the first, second and third resin members are overlapped in this order. Therefore excellent aesthetic appearance is obtained because a weld trace does not appear at the surface layer. The laser-welded body has high bonding strength because the first and third resin members sandwich the second resin member having the butted part. In this case, the laser-welded body has high sealability because the contacted parts and the butted part are simultaneously and rigidly welded.

BRIEF DESCRIPTION OF DRAWINGS

The patent or application file contains at least one drawing executed in color. Copies of this patent of patent application publication with the color drawing will be provided by the Office upon request and payment of the necessary fee.

MODE FOR CARRYING OUT THE INVENTION

Hereunder, embodiments to practice the present invention will be explained in detail, but the scope of the present invention is not restricted by these embodiments. Incidentally in the present description, the term "to" is used as referring to include values sandwiching it as an upper limit and a lower limit.

Figure 1:
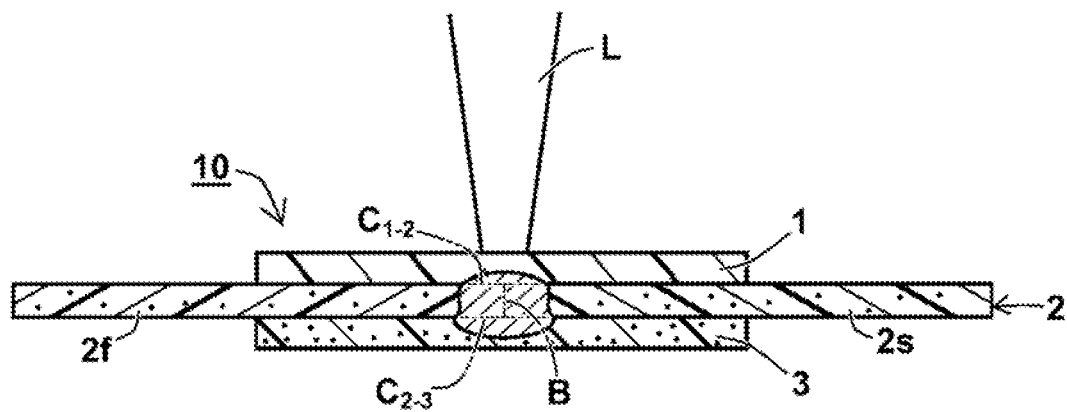
FIG. 1 is a schematic cross sectional view showing a scene from preparing a laser-welded body of the present invention by laser-welding. First and third resin members are overlapped so as to sandwich a butted part of a second resin member including two resin members.

FIG. 1 shows a schematic cross sectional view showing a scene from preparing an example of a laser-welded body of the present invention. In a laser-welded body 10, a plurality of resin members are integrated by bonding via laser-welding of these resin members. According to the laser-welded body 10, a laser-transmissible resin member 1 as a first resin member, a laser-weakly-absorptive resin member 2, which is a second resin member and has a resin member piece 2f and a resin member piece 2s, and a laser-absorptive resin member 3 as a third resin member are overlapped in this order. The respective resin members 1, 2, 3 have a planar plate shape having a uniform thickness. The respective resin members 1, 2, 3 contain a thermoplastic resin. The laser-weakly-absorptive resin member 2 and the laser-absorptive resin member 3 contain nigrosine as a laser beam absorbent.

In the laser-weakly-absorptive resin member 2, the both resin member pieces 2f, 2s are the same kind of a resin member or the different kind of a resin member. The both resin member pieces 2f, 2s stay in a row while forming a butted part B in which ends thereof are brought into contact each other. An interface between the laser-transmissible resin member 1 and the laser-weakly-absorptive resin member 2 is a contacted part $C_{1-2}$ which is laser-welded together with the butted part B. Further, an interface of the laser-weakly-absorptive resin member 2 and the laser-absorptive resin member 3 is a contacted part $C_{2-3}$ which is laser-welded together with the butted part B.

The laser-transmissible resin member 1 is a laser-irradiated subject which is placed at an irradiation side of the laser beam L. An absorbance $a_1$ of the laser-transmissible resin member 1 is less than 0.13 at a maximum, may be 0.01 to 0.12, is preferably 0.01 to 0.1, more preferably 0.01 to 0.098, even more preferably 0.01 to 0.09 relative to a laser beam having a wavelength band of 940 nm which is output from such as a semiconductor laser. When an exothermic amount is increased by using the laser beam absorbent, the absorbance $a_1$ may be 0.05 to 0.12, is preferably 0.05 to 0.1, is more preferably 0.07 to 0.098, is even more preferably 0.07 to 0.09. In the laser-weakly-absorptive resin member 2, respective absorbances $a_2$ and $a_{2s}$ of the both resin member pieces 2f, 2s are preferably 0.1 to 0.9, more preferably 0.1 to 0.8. An absorbance ratio $a_{2f}/a_{2s}$ of the absorbance $a_{2f}$ to the absorbance $a_{2s}$ is preferably 0.3 to 1.2, more preferably 0.7 to 1.2. An absorbance $a_3$ of the laser-absorptive resin member is preferably 0.2 to 3.8, more preferably 0.3 to 3.8. The laser-weakly-absorptive resin member 2 contains a smaller amount of the nigrosine than the laser-absorptive resin member 3. The laser-weakly-absorptive resin member 2 thereby preferably has a low absorbance compared to the laser-absorptive resin member 3. Further, the wavelength of the laser beam L is preferably 800 to 1600 nm, more preferably 800 to 1100 nm.

An amount of the exotherm of the respective resin members 1, 2, 3 which is generated due to the laser beam L entered from the laser-transmissible resin member 1 is increased in stages because the respective absorbances $a_1$, $a_2$, $a_3$ of the respective resin members 1, 2, 3 are transited in stages. Specifically, when $a_1$ and $a_2$ are in the above ranges, the exothermic amount at the interface (contacted part $C_{1-2}$) between the laser-transmissible resin member 1 and the laser-weakly-absorptive resin member 2 is increased and thus, welding between these rein members is accelerated. In addition, $a_2$ and $a_3$ have the above ranges. Thereby, even if the laser beam L has been absorbed into the laser-weakly-absorptive resin member 2 until it reaches the laser-absorptive resin member 3, heat is sufficiently generated at the interface (contacted part $C_{2-3}$) between the laser-weakly-absorptive resin member 2 and the laser-absorptive resin member 3. These resin members are reliably welded thereat and bonded at therebetween.

Especially, the laser-weakly-absorptive resin member 2 has the absorbance $a_2$ in the above range and contains the nigrosine. Thereby, the laser-weakly-absorptive resin member 2 sufficiently generates heat and diffuses fast the heat toward horizontal and vertical directions thereof. In the result, the laser-weakly-absorptive resin member 2 is melted at a wide area thereof and welded to the laser-transmissible resin member 1 and the laser-absorptive resin member 3 through the contacted parts $C_{1-2}$, $C_{2-3}$. Radiation of the laser beam L is not necessarily performed in an only straight line (in FIG. 1, a direction in depth) along the butted part B. Selectivity of laser radiation coverage can be wide. Further, scorch marks and voids due to energy concentration of the laser beam L are not incurred. For example, tensile strength (in accordance with Japanese Industrial standard K7161: 2014) of the laser-welded body 10 exhibits at least 700 N because the respective resin members 1, 2, 3 of the laser-welded body 10 are bonded by high bonding strength.

When an absorbance of the thermoplastic resin which is contained as a raw material of the laser-transmissible resin member 1 is low, laser beam transmittance of the laser-transmissible resin member 1 is excessively high. It is difficult to generate heat necessary for welding the lase-transmissible resin member 1 when the laser beam absorbent such as the nigrosine may be added into a laser-transmissible rein composition which is used to form it. Thereby the above absorbance $a_1$ can be obtained. Incidentally, when $a_1$ is 0.07 to 0.09, the transmittance relative to the laser beam L having the wavelength 940 nm is 70% or more in the laser-transmissible resin member 1 employing a polyamide resin.

The laser beam L which has been transmitted through the laser-transmissible resin member 1 is entered into the laser-weakly-absorptive resin member 2. The laser-weakly-absorptive resin member 2 absorbs a one part of the laser beam L together with transmitting the other part thereof. Thereby the laser-weakly-absorptive resin member 2 generates heat and melts. The heat radiates and conducts to the respective contacted parts $C_{1-2}$, $C_{2-3}$, and melts these. The laser-absorptive resin member 3 generates heat and melts at especially the contacted part $C_{2-3}$ because heat-radiating and heat-conducting have occurred at the laser-weakly-absorptive resin member 2 and the laser beam L, which have been transmitted through the laser-transmissible resin member 1 and the laser-weakly-absorptive resin member 2 and have entered thereinto, have been absorbed thereinto. In the result, the contacted parts $C_{1-2}$, $C_{2-3}$ are solidly welded.

An amount of which the laser beam absorbent such as the nigrosine is added into a raw material resin is suitably increased and decreased based on an absorbance originated from the raw material resin thereof. Thereby the absorbances of the respective resin members 1, 2, 3 and the both resin pieces 2f, 2s can meet values of the above range.

Figure 2:
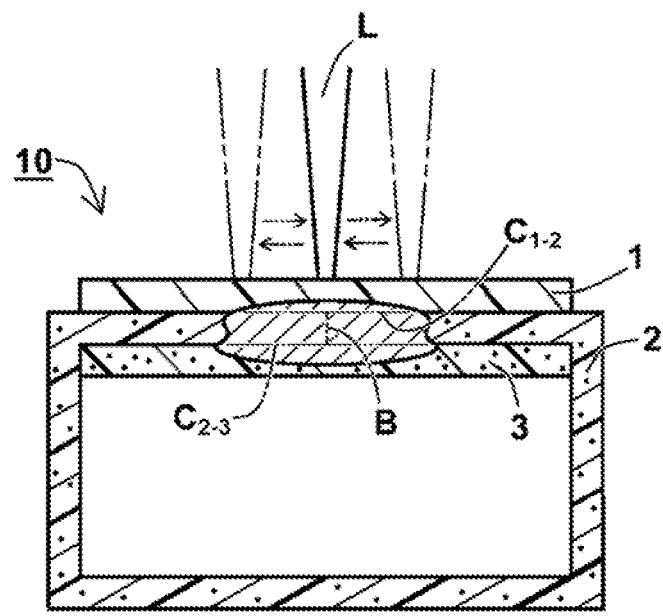
FIG. 2 is a schematic cross sectional view showing a scene from preparing a laser-welded body of the present invention by laser-welding. First and third resin members are overlapped so as to sandwich a butted part of a single second resin member which is butted at two ends thereof by being folded.

The laser-welded body 10 may have the butted part B which is shown in FIG. 2. The laser-weakly-absorptive resin member 2 as the second resin member is folded or formed at a right angle so as to be a mountain fold or a valley fold in all four parts. The ends thereof are butted and contacted.

The laser beam L not only radiates so as to aim the butted part B but also may radiate as follows. For example, as shown in FIG. 2, the laser beam L may widely radiate while scanning not only in a X direction (a depth direction in FIG. 2) along the butted part B but also a Y direction (directions to right and left in FIG. 2) which intersects with it at right angles. A whole area of the contacted part $C_{1-2}$ which is the interface of the laser-transmissible resin member 1 and the laser-weakly-absorptive resin member 2 and the contacted part $C_{2-3}$ which is the interface of the laser-weakly-absorptive resin member 2 and the laser-absorptive resin member 3 may be welded by irradiating a whole surface of the laser-transmissible resin member 1 with the laser beam L.

As shown in FIG. 3(a), the laser-welded body 10 may have a cylindrical shape. The both resin member pieces 2f, 2s are curved into an arch shape or formed thereinto and butted at the both ends. Thereby the laser-weakly-absorptive resin member 2 has the cylindrical shape having two butted parts $B_1$, $B_2$ (see FIG. 3(b)). The laser-weakly-absorptive resin member 2 is inserted into the laser-transmissible resin member 1 having an inner diameter which is somewhat larger than an outer diameter of the laser-weakly-absorptive resin member 2. In addition, the laser-absorptive resin member 3 having an outer diameter which is somewhat smaller than an inner diameter of the laser-weakly-absorptive resin member 2 is inserted thereinto.

A front view of FIG. 3(a) is shown in FIG. 3(b). The laser beams L are aimed so as to oppose while interposing the respective resin members 1, 2, 3. The respective resin members 1, 2, 3 are welded and bonded at the respective butted parts $B_1$, $B_2$, the contacted part $C_{1-2}$ positioned at a side of the laser-transmissible resin member 1 and the contacted part $C_{2-3}$ positioned at a side of the laser-absorptive resin member 3. The respective butted parts $B_1$, $B_2$ and the contacted parts $C_{1-2}$, $C_{2-3}$ may be welded by rotating the respective resin members 1, 2, 3 having the cylindrical shape about a central axis thereof while radiating the laser beam L from a single location.

Figure 3:
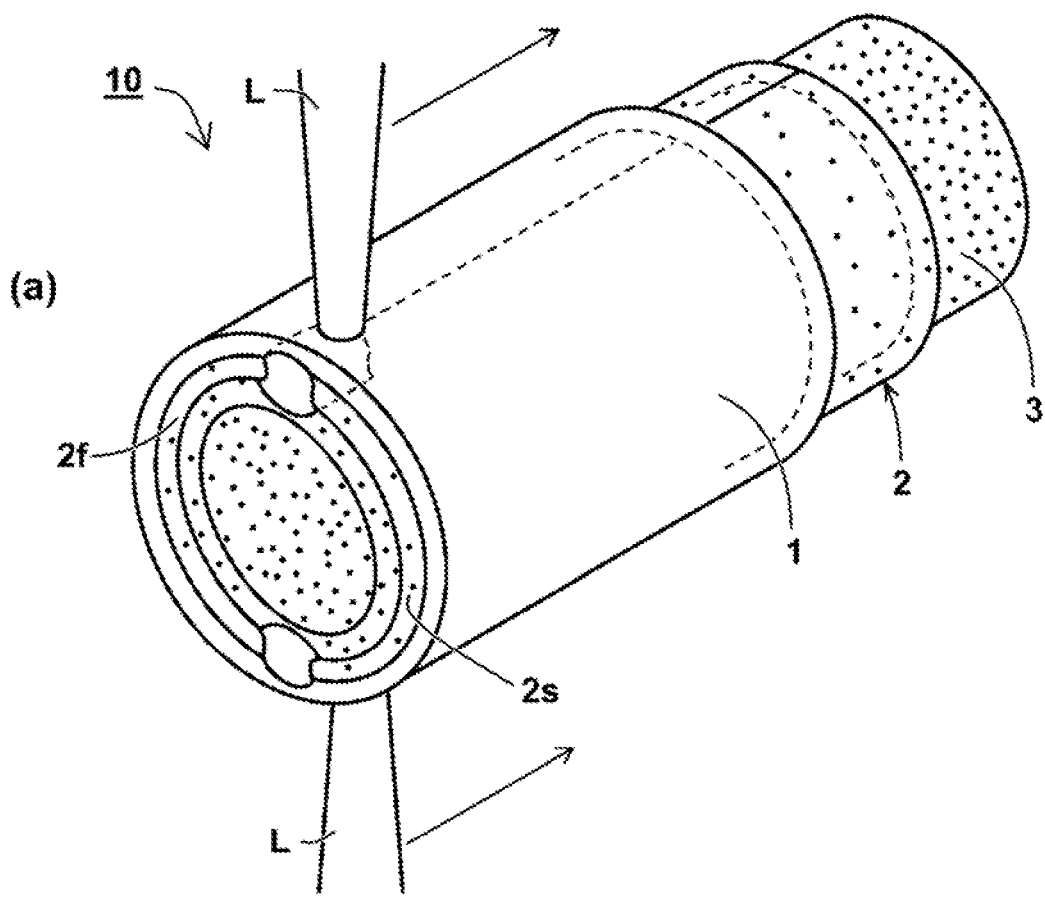
FIG. 3 is a perspective view and a front view thereof showing a scene from preparing a laser-welded body of the present invention by laser-welding. First, second and third resin members are overlapped by inserting the cylindrical-shaped second resin member, in which respective ends of two resin members are butted, into the cylindrical-shaped first resin member and by inserting the cylindrical-shaped third resin member into the second resin member.
Figure 3:
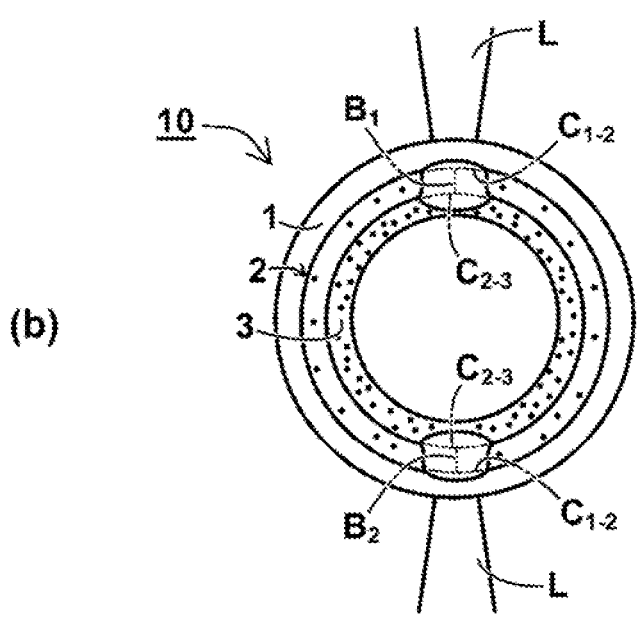

Incidentally, the shape of the laser-welded body 10 is not restricted in the shapes shown in FIGS. 1 to 3. The laser-welded body 10 may have a roll shape, a cylindrical shape, a prismatic shape and a boxed shape. These shapes are curved or bent. Further, for example, after a contacted part $C_{1-3}$ with the laser-absorptive resin member 3 is formed by covering the laser-weakly-absorptive resin member 2 and the laser-absorptive resin member 3 with the laser-transmissible resin member 1, the laser beam L is aimed at the whole surface of the laser-transmissible resin member 1. Thus, not only the butted part B and the contacted parts $C_{1-2}$, $C_{2-3}$ but also a contacted part $C_{1-3}$ may be welded.

As a specific production method for the laser-welded body 10, first to third production methods may be exemplified. The first production method includes welding and bonding the respective resin members 1, 2, 3 by a one laser-welding process after overlapping these. The second production method includes welding and bonding the both resin member pieces 2f, 2s composing the laser-weakly-absorptive resin member 2; and bonding the respective resin members 1, 2, 3 by laser-welding after sandwiching the laser-weakly-absorptive resin member 2 between the laser-transmissible resin member 1 and the laser-absorptive resin member 3. The third production method includes folding and/or rolling the single laser-weakly-absorptive resin member 2 not having resin member pieces; forming the butted part B by butting the both ends thereof; overlapping the laser-transmissible resin member 1 and the laser-absorptive resin member 3 while sandwiching the butted part B; and bonding the respective resin members 1, 2, 3 by laser-welding. First, the first and second production methods will be explained while referring FIG. 1.

First Production Method

The first production method has following steps 1A to 1E.

Step 1A: A laser-transmissible resin composition containing at least the thermoplastic resin is prepared. The laser-transmissible resin composition may optionally contain additives such as the laser beam absorbent and coloring agents. The laser-transmissible resin member 1 having a shape such as a square plate shape is molded by using a molding machine. The laser-transmissible resin member 1 is positioned in a side into which the laser beam is entered. The absorbance $a_1$ of the laser-transmissible resin member 1 with respect to the laser beam having the wavelength region of 940 nm which is output from e.g. the semiconductor laser may be 0.01 to 0.12 which is less than 0.13 at a maximum, preferably 0.01 to 0.1, more preferably 0.01 to 0.098, even more preferably 0.01 to 0.09. When the exothermic amount is increased by using the laser beam absorbent, the absorbance $a_1$ may be 0.05 to 0.12, is preferably 0.05 to 0.1, is more preferably 0.07 to 0.098, and is even more preferably 0.07 to 0.09.

Step 1B: A laser-weakly-absorptive resin composition containing at least the thermoplastic resin and the laser beam absorbent is prepared. The laser-weakly-absorptive resin composition may optionally contain the additives such as the coloring agents. A content of the laser beam absorbent is adjusted on the basis of an original absorbance of the thermoplastic resin so that the absorbances $a_{2f}$, $a_{2s}$ of the both resin member pieces 2f, 2s with respect to e.g. the laser beam having the wavelength region of 940 nm which is output from the semiconductor laser fall within the range of 0.1 to 0.9. The both resin member pieces 2f, 2s as the laser-weakly-absorptive resin member 2 having the shape e.g. the square plate shape are molded by using the molding machine. The both resin member pieces 2f, 2s may be molded by from the laser-weakly-absorptive resin composition of the same or different kinds respectively.

Step 1C: A laser-absorptive resin composition containing at least the thermoplastic resin and the laser beam absorbent is prepared. The laser-absorptive resin composition may optionally contain the additives such as the coloring agents. A content of the laser beam absorbent is adjusted on the basis of the original absorbance of the thermoplastic resin so that the absorbance $a_3$ of the laser-absorptive resin member 3 with respect to e.g. the laser beam having the wavelength region of 940 nm which is output from the semiconductor laser meet the range of 0.2 to 3.8. The laser-absorptive resin member 3 having the shape e.g. the square plate shape is molded by using the molding machine.

Step 1D: The laser-weakly-absorptive resin member 2 is formed by forming the butted part B through butting and contacting the ends of the both resin member pieces 2f, 2s.

The laser-transmissible resin member 1, the laser-weakly-absorptive resin member 2 and the laser-absorptive resin member 3 are overlapped in this order. Thereby the laser-weakly-absorptive resin member 2 is sandwiched between the laser-transmissible resin member 1 and the laser-absorptive resin member 3, and brought into contact with these. Hereat the respective resin members 1, 2, 3 may be fixed by compressing after clamping those by a jig. Furthermore, an anti-reflection member such as a glass plate, an anti-reflection film or a transmissible member such as a glass plate, which does not shield and not damp the laser beam, may be used. The anti-reflection member and the transmissible member may be placed on a laser-incident face of the laser-transmissible resin member 1. A cooling treatment of blowing cool air or room-temperature air and/or inert gas on the face into which the laser beam L enters may be performed. When gas is generated from the respective resin members 1, 2, 3 and the both resin member pieces 2f, 2s during laser-welding, the gas may be treated by using a gas treatment apparatus.

Step 1E: The laser beam L which is set to a suitable condition radiates from the side of the laser-transmissible resin member 1 to the butted part B. A part of the laser beam L is transmitted through the laser-transmissible resin member 1. The other part thereof is somewhat absorbed into the laser-transmissible resin member 1 and heats the contacted part $C_{1-2}$. The part of the laser beam L which is transmitted through it reaches a neighborhood of the butted part B. The part of the laser beam L is absorbed into the both resin member pieces 2f, 2s and causes the exotherm at the neighborhood of the butted part B. The both resin member pieces 2f, 2s therefore are molten at the neighborhood of the butted part B. This molten part is first expanded to the contacted part $C_{1-2}$ located directly above the butted part B and the contacted part $C_{2-3}$ located directly below the butted part B. The molten part is expanded from these to wholes of the contacted part $C_{1-2}$ and the contacted part $C_{2-3}$. A part of the laser beam L which is transmitted through it is absorbed into the laser-absorptive resin member 3 while involving thermal conductivity and thermal radiation. The contacted part $C_{2-3}$ of the laser-absorptive resin member 3 generates heat and is melted. The butted part B and the contacted parts $C_{1-2}$, $C_{2-3}$ which has been heated and molten are solidified via cooling and thus, welding is performed. At the result, the laser-transmissible resin member 1, the laser-weakly-absorptive resin member 2 and the laser-absorptive resin member 3 are solidly bonded via the butted part B and the contacted parts $C_{1-2}$, $C_{2-3}$ and thus, these are integrated.

Incidentally, the shape of the respective resin members 1, 2, 3 and the both resin members 2f, 2s which may be formed by one or a plurality of the laser-weakly-absorptive resin composition are not restricted in a plurality of the planar plate shape having a uniform thickness as shown in FIG. 1. The shape of these may be a single film, or alternatively may be a roll shape, a cylindrical shape, a prismatic shape and a boxed shape which are curved or bent. Practical and any shapes may be employed. To form these, a mold may be used. In the respective resin member 1, 2, 3 and the both resin member pieces 2f, 2s, shapes of parts such as the butted part B and the contacted parts $C_{1-2}$, $C_{2-3}$ which are butted, overlapped, opposed, abutted or brought into contact with each other may be any shapes. For example, a stepped profile as a margin portion may be formed into the parts which should be overlapped.

Second Production Method

The second production method has following steps 2A to 2E.

The steps 2A to 2C are in the same as the steps 1A to 1C of the first production method.

Step 2D: The butted part B is formed by butting and contacting the ends of the both resin member pieces 2f, 2s. Hereat the both resin members pieces 2f, 2s may be fixed through putting those in a jig or clamping those by the jig. Furthermore, an anti-reflection member such as a glass plate, an anti-reflection film or a transmissible member such as a glass plate, which does not shield and not damp the laser beam, may be used. The anti-reflection member and the transmissible member may be placed on faces of the both resin member pieces 2f, 2s which should overlap the laser-transmissible resin member 1. A cooling treatment of blowing cool air or room-temperature air and/or inert gas on the face into which the laser beam L enters may be performed. The laser beam L is aimed at the butted part B. The laser beam L is absorbed into the both resin member pieces 2f, 2s at the butted part B. The both resin member pieces 2f, 2s are melted near the butted part B. The butted part B is welded and solidified through cooling the molten part. Thus, the both resin member pieces 2f, 2s are bonded. Accordingly, the laser-weakly-absorptive resin member 2 is obtained. Incidentally, when gas is generated from the respective resin members 1, 2, 3 and the both resin member pieces 2f, 2s due to laser-welding, the gas may be cleaned by using a gas treatment apparatus.

Step 2E: The laser-transmissible resin member 1, the laser-weakly-absorptive resin member 2 and the laser-absorptive resin member 3 are brought into contact with each other by overlapping these in this order. The laser beam L which is set to a suitable condition is radiates from the side of the laser-transmissible resin member 1 to the butted part B. Thereby in the same manner as the step 1E, the respective resin members 1, 2, 3 are solidly bonded via the butted part B and the contacted parts $C_{1-2}$, $C_{2-3}$ and thus, these are integrated.

Third Production Method

The third production method will be explained while referring FIG. 2. FIG. 2 is a schematic cross-sectional view showing a scene from preparing another example of the laser-welded body 10. The third production method has following steps 3A to 3E.

The steps 3A and 3C are in the same as the steps 1A and 1C of the first production method, respectively.

Step 3B: As for the laser-weakly-absorptive resin member 2, the laser-weakly-absorptive resin composition containing at least the thermoplastic resin and the laser beam absorbent is prepared. The laser-weakly-absorptive resin composition may optionally contain the additives such as the coloring agents. The content of the laser beam absorbent is adjusted on the basis of an original absorbance of the thermoplastic resin so that the absorbances $a_2$ of the laser-weakly-absorptive resin member 2 with respect to e.g. the laser beam having the wavelength region of 940 nm which is output from the semiconductor laser meet the range of 0.1 to 0.9. The laser-weakly-absorptive resin member 2 having the square plate shape is formed by using the molding machine. The laser-weakly-absorptive resin member 2 is folded the all four right angles so as to be the mountain folds or the valley folds. The butted part B is formed by butting and contacting the ends thereof. The laser-weakly-absorptive resin member 2 is shaped into a tubular-quadrangular prism shape.

Step 3D: The laser-transmissible resin member 1 is brought into contact with an outer face of the laser-weakly-absorptive resin member 2, and the laser-absorptive resin member 3 is brought into contact with an inner face thereof so as to bring the laser-transmissible resin member 1 and the laser-absorptive resin member 3 into contact with the butted part B, respectively. The laser-transmissible resin member 1, the laser-weakly-absorptive resin member 2 and the laser-absorptive resin member 3 are overlapped in this order at a part of the laser-weakly-absorptive resin member 2 having the tubular-quadrangular prism shape.

Step 3E: The laser beam L which is set to a suitable condition and radiates from the side of the laser-transmissible resin member 1 hits the butted part B. If necessary, the laser beam L may be scanned. Thereby in the same manner as the step 1E, the respective resin members 1, 2, 3 are solidly bonded via the butted part B and the contacted parts $C_{1\text{-}2}$, $C_{2\text{-}3}$ and thus, these are integrated.

The laser-weakly-absorptive resin member 2 having the tubular-quadrangular prism shape is exemplified in FIG. 2 however the shape of the respective resin members 1, 2, 3 is not restricted therein. The shape of the respective resin members 1, 2, 3 may be a single film, or alternatively may be a roll shape, a cylindrical shape, a prismatic shape and a boxed shape which are curved or bent. Practical and any shapes may be employed. To form these, a mold may be used. In the respective resin member 1, 2, 3 and the both resin member pieces 2f, 2s which may be formed by one or a plurality of the laser-weakly-absorptive resin composition, shapes of parts such as the butted part B and the contacted parts $C_{1\text{-}2}$, $C_{2\text{-}3}$ which are butted, overlapped, opposed, abutted or brought into contact with each other may be any shapes. For example, a stepped profile as a margin portion may be formed into the parts which should be overlapped.

In the first to third production methods, butt-welding at the butted part B and overlap-welding at the contacted parts $C_{1\text{-}2}$, $C_{2\text{-}3}$ may be performed via one radiation of the laser beam L. Alternatively, a plurality of the radiation of the laser beam L may be performed so that locations which are irradiated therewith are different in each case. The radiation of the laser beam L may be performed while scanning. According to these, a whole of the interfaces between the respective resin members 1, 2, 3 may be overlap-welded. Accordingly, the bonding strength of the laser-welded body 10 is greatly increased.

The laser-welded body 10 is a three-layered laser-welded body that the laser-transmissible resin member 1 as the first resin member, the laser-weakly-absorptive resin member 2 as the second resin member having at least one the butted part B and the laser-absorptive resin member 3 as the third resin member are overlapped in this order. When the respective resin members 1, 2, 3 have the same color tone or similar color tone each other, a boundary therebetween and a welding mark may be diminished. Thereby, the laser-welded body 10 having high designability is obtained. The color tone is preferably a deep color, especially black color tone. In this case, adding the coloring agent containing anthraquinone to the thermoplastic resin for forming the laser-transmissible resin member 1 as the first resin member is preferable, leastwise. Adding the coloring agent containing an anthraquinone blue dye, an anthraquinone red dye and an anthraquinone yellow dye thereto is more preferable.

As the laser beam L, the infrared ray ranging from 800 to 1600 nm that is a longer wavelength as compared with visible radiation, preferably, an oscillation wavelength ranging from 800 to 1100 nm may be used. As examples of the laser beam, a solid laser (Nd: yttrium aluminum garnet (YAG) excitation, semiconductor laser excitation and the like), a semiconductor laser, a tunable diode laser, a titanium-sapphire laser (Nd: YAG excitation) are preferably used. For other examples, a halogen lamp or a xenon lamp that generate the infrared ray having the wavelength of 700 nm or more may be used. In addition, the radiation of the laser beam L may be vertically performed and may be performed at an angle relative to the face of the laser-weakly-absorptive resin member 2, and may be performed at a single direction or multiple directions. Output power of the laser beam L is adjusted corresponding to a scan speed and the absorbances of the respective resin members 1, 2, 3.

When the halogen lamp generating the infrared ray having wavelength of 700 nm or more is used, for example, halogen lamps which are arranged in a band form are exemplified. Examples of a laser radiation procedure are a scanning type in which the radiation of the laser beam may be broadly performed by moving the lamp; a masking type in which the resin members which should be welded move; and a simultaneous radiation type that the lamps simultaneously illuminate the resin members which should be welded from multiple directions. A radiation width of the infrared ray, a radiation time thereof, radiation energy thereof and the like can be adjusted properly. The halogen lamp has an energy distribution centering on near infrared region, so the energy exist at a shorter wavelength side of the energy distribution, that is to say a visible region. In such a case, the energy of the visible region may be shielded by using a cut-off filter etc. because welding scars may be made on the surface of the resin member which is irradiated with the ray.

The thickness of the all resin members 1, 2, 3 is preferably within the range of 200 to 5000 μm respectively. Especially, the thickness of the respective resin members 1, 2 which require laser beam transmittivity is more preferably 500 to 4000 μm, even more preferably 700 to 3000 μm. When the thickness is less than 200 μm, control of the energy of the laser beam is difficult. When too much or too little thermal fusing is occurred at the time of laser-welding, a break is occurred by excessive heat, or the bonding strength is insufficiently obtained by too little heat. In contrast, when the thickness is thicker than 5000 μm, a distance to the portion should be welded is far. The laser beam entering into the laser-weakly-absorptive resin member 2 is damped without being transmitted through the internal part thereof. The bonding strength is insufficiently obtained.

As the laser beam absorbent contained in the respective resin members 1, 2, 3, the nigrosine and derivatives thereof, aniline black, phthalocyanine, naphthalocyanine, porphyrin, cyanine-based compounds, perylene, quaterrylene, azo metal complexes, anthraquinone absorbing near-infrared region, squaric acid derivatives, an immonium dye and the like are exemplified. Especially, the nigrosine and the derivatives thereof are preferable. An absorption coefficient $\varepsilon_d$ (ml/g·cm) of the laser beam absorbent is 1000 to 8000 (ml/g·cm), preferably 1000 to 6000 (ml/g·cm), more preferably 3000 to 6000 (ml/g·cm).

A measuring procedure of the absorption coefficient (absorptivity) $\varepsilon_d$ as follows. The laser beam absorbent in an amount of 0.05 g of is precisely weighed and is dissolved into solvent such as N,N-dimethylformamide (DMF) by using a 50 ml type measuring flask. By using the 50 ml type measuring flask, 1 ml of the resultant solution is diluted with DMF. A measuring sample is prepared. Then the absorbance of the measuring sample is measured by using a spectrophotometer (manufactured from Shimadzu Corporation, tradename: UV1600PC).

Coloring of the thermoplastic resin is performed for the purpose of a decorative effect, a color classification effect, improvement of light resistance of a molded product, protection or masking of contents. A black-coloring is strongly demanded in the industry. The coloring by an oil soluble dye is suitable because the oil soluble dye exhibits a good dispersibility and compatibility with respect to the resin. In particular, the nigrosine, which can be used as the black coloring agent and as the laser beam absorbent and can bring the higher bonding strength, is preferably used.

As nigrosine, black azine-based condensation mixtures described in Color Index as C.I. Solvent Black 5 and C.I. Solvent Black 7 are exemplified. The nigrosine is synthesized through dehydrating and condensing, and oxidizing e.g. aniline, aniline hydrochloride and nitrobenzene at 160 to 180° C. of a reaction temperature in the presence of iron chloride. In the view of an effect which increases fluidity of the thermoplastic rein, C.I. Solvent Black 5 is more preferable.

Volume resistivity of the nigrosine is preferably $0.5 \times 10^9$ to $5.0 \times 10^{11}$ $\Omega \cdot cm$, more preferably $3.0 \times 10^9$ to $1.0 \times 10^{11}$ $\Omega \cdot cm$. The nigrosine via refining process for removing impurities such as inorganic salts etc. is preferably used because it does not decrease physical properties of the resin composition as the raw material of the respective resin members 1, 2, 3. Materials containing the nigrosine exhibiting the high volume resistivity are preferably and widely used in parts requiring the high insulation such as the electrical parts and the electronic parts. The volume resistivity of the nigrosine is obtained as follows. A sample is prepared by measuring an amount of the nigrosine. The sample is solidified by loading 200 kgf. A volume of the sample is measured. The volume resistivity of the sample is measured by using a digital ultrahigh resistance/microcurrent ampere meter (manufactured by ADC CORPORATION, tradename: 8340A).

The preferred nigrosine is a sulfate thereof. The nigrosine sulfate increases the fluidity of the resin composition when the laser-welding because it has features as a fluidity improving agent, a surface luster improving agent and a crystallization temperature decreasing agent.

According to production reaction system of the nigrosine employing the iron chloride as a catalyst, nigrosine hydrochloride is produced because the reaction proceeds in the presence of the iron chloride and/or excessive hydrochloride. A method for producing the nigrosine sulfate from the nigrosine hydrochloride is not restricted as long as entire chloride ion or corresponded parts thereof are replaced with sulfate ion, a known reaction method may be used. Incidentally, the nigrosine sulfate is not a water soluble black dye belonging to C.I. Acid Black 2 but is an oil soluble black dye belonging to C.I. Solvent Black 5.

The method for producing the nigrosine sulfate includes, specifically, for example, dispersing the nigrosine into dilute sulfuric acid and suitably heating it (e.g. 50 to 90° C.). In addition, for example, the nigrosine sulfate may be produced through the steps of dispersing a condensation reaction solution obtained by producing the nigrosine into dilute sulfuric acid and the steps of suitably heating it (e.g. 50 to 90° C.). Furthermore, for example, the nigrosine sulfate may be produced through the steps of dissolving the nigrosine in concentrated sulfuric acid while maintaining a temperature of a reaction solution at a low temperature so as to prevent sulfonation and the steps of adding the resultant solution into a large amount of ice water to deposit a crystal.

With regard to the nigrosine sulfate, as a sulfate (ion) concentration is 0.3 to 5% by mass, preferably 0.5 to 3.5% by mass, a decreasing effect of the crystallization temperature of the thermoplastic resin is increased. Thereby a laser-welding process may be simply and stably performed.

As the nigrosine mentioned above, tradename "NUBIAN BLACK" series are commercially available from ORIENT CHEMICAL INDUSTRIES CO., LTD.

In the laser-weakly-absorptive resin member 2, a content of the laser beam absorbent such as the nigrosine adjusting the absorbance is 0.005 to 0.2% by mass with respect to the thermoplastic resin. Specifically, when the thermoplastic resin which is contained in the laser-weakly-absorptive resin member 2 (the resin member pieces 2f, 2s) is the polyamide resin, a polycarbonate resin or a polypropylene resin, the content of the laser beam absorbent is preferably 0.01 to 0.2% by mass, more preferably 0.02 to 0.18% by mass. When the thermoplastic resin is a polybutylene terephthalate resin or a polyphenylene sulfide rein, the content the laser beam absorbent is preferably 0.005 to 0.15% by mass. When the content is less than the lower limit, the exothermic amount of the respective resin members 1, 2, 3 is too little and thus, a temperature thereof insufficiently rises. In a result, the bonding strength of the butted part B and the contacted parts $C_{1-2}$, $C_{2-3}$ is deficient. When the content is higher than 0.2% by mass, a laser beam transmittance is significantly decreased. Decreasing of the bonding strength between the respective resin members 1, 2, 3 and poor welding inducing welding scars and scorch marks due to excessive energy are incurred.

The nigrosine brings high luster to the surface of the resin members and has the features as the crystallization temperature decreasing agent, the fluidity improving agent and the surface luster improving agent. A melt flow rate of the laser-weakly-absorptive resin member 2 is preferably 10 to 50 g/10 minutes, more preferably 11 to 30 g/10 minutes. The laser-weakly-absorptive resin member 2 has a low crystallization temperature by containing the nigrosine sulfate compared to a resin member containing nigrosine hydrochloride. Thereby the laser-weakly-absorptive resin member 2 which is thermally fused by receiving radiation with the laser beam L is rich in the fluidity. Therefore even when the butted part B and the contacted part C are formed while having an interspace due to surface roughness of the respective resin members 1, 2, 3, the thermally fused laser-weakly-absorptive resin member 2 is flowed into the interspace and thus, the interspace is solidly filled. In the result, the resin members 1, 2, 3 are strongly welded. The melt flow rate of the laser-weakly-absorptive resin member 2 is preferably 11 to 30 g/10 minutes, more preferably 12 to 20 g/10 minutes and even more preferably 13 to 18 g/10 minutes.

In the laser-absorptive resin member 3, the absorbance $a_3$ of 0.2 to 3.8 (e.g. the wavelength region of 940 nm which is output from the semiconductor laser) is low compared to a laser-absorptive resin member which is publicly know. The rapid and excessive exotherm does not occur at the laser-absorptive resin member 3 by the laser beam L which has been transmitted through the laser-weakly-absorptive resin member 2 (the rein member pieces 2f, 2s) because the absorbance $a_3$ has the above range. The absorbance $a_3$ is obtained by adjusting the content of the laser beam absorbent such as the nigrosine on the basis of an original absorbance of the thermoplastic resin which is contained in a raw material. Specifically, the content thereof is preferably 0.03 to 2% by mass, more preferably 0.04 to 0.9% by mass.

The laser-absorptive resin member 3 may optionally contain carbon black in a small amount as the laser beam absorbent.

The values of the absorbance $a_2$ of the laser-weakly-absorptive resin member 2 and the absorbance $a_3$ of the laser-absorptive resin member 3 is suitably decided depending on applications, objects and environments of a laser process. Incidentally, in the present description, the representations of the laser-weakly-absorptive resin member 2 and the laser-absorptive resin member 3 is used to distinguish between the both resin members 2, 3 because the absorbance $a_2$ of the laser-weakly-absorptive resin member 2 and the absorbance $a_3$ of the laser-absorptive resin member 3 are duplicative. According to the definition of the absorbance in theory, the absorbance which indicates no transmission of the laser beam is 2.0. A resin member having the absorbance of 0.2 or more and less than 2.0 exhibits laser beam transmittivity. In order to weld the laser-weakly-absorptive resin member 2 and the laser-absorptive resin member 3, a one part of the laser beam L has to reach the laser-absorptive resin member 3 by transmitting through the laser-weakly-absorptive resin member 2. Therefore the absorbance $a_2$ ($a_{2f}$, $a_{2s}$) of the laser-weakly-absorptive resin member 2 is determined so that the laser-weakly-absorptive resin member 2 absorbs the other part of the laser beam L while transmitting the one part thereof. The one part of the laser beam L which is transmitted through the laser-weakly-absorptive resin member 2 reaches the laser-absorptive resin member 3. Thereby the laser-absorptive resin member 3 generates heat and fuses by absorbing the one part of the laser beam L which has transmitted through the laser-weakly-absorptive resin member 2. Finally, the laser-weakly-absorptive resin member 2 and the laser-absorptive resin member 3 are welded.

In the range of the absorbance $a_2$ (0.1 to 0.9) of the laser-weakly-absorptive resin member 2, the higher value (0.5 to 0.9) thereof is, the laser-weakly-absorptive resin member 2 exhibits greater exothermic force. Thermal conductive force thereof is increased. In this case, a phenomenon of decreasing the laser beam transmittivity is occurred. The exothermic amounts of the both resin members 2, 3 is adjusted by suitably adjusting the absorbance $a_3$ of the laser-absorptive resin member 3. On the other hand, the lower value (0.1 to 0.5) of $a_2$ is, the lower exothermic force of the laser-weakly-absorptive resin member 2 is. The thermal conductive force thereof is decreased. In this case, a phenomenon of increasing the laser beam transmittivity is occurred. When the absorbance $a_3$ of the laser-absorptive resin member 3 is suitably adjusted, the exothermic amount, a scanning time and an energy amount of the radiation may be adjusted and thus, the laser-welding is stably performed.

The thermoplastic resin contained in the respective resin members 1, 2, 3 is freely selected as long as the laser beam absorbent can be contained therein.

As the thermoplastic resin, for example, a resin which has the laser beam transmittivity and is used as a dispersant of pigments and a resin which is used as carrier resins of masterbatches and colored pellets are exemplified. Specifically, the thermoplastic resin is exemplified as follows. A polyphenylene sulfide resin (PPS); a polyamide resin (NYLON (registered trademark), PA); a polyolefin resin such as a polyethylene resin and a polypropylene resin; a polystyrene resin; a polymethylpentene resin; a methacryl resin; an acryl polyamide resin; an ethylene vinyl alcohol resin (EVOH), a polycarbonate resin; a polyester resin such as a polyethylene terephthalate resin (PET) and a polybutylene terephthalate resin (PBT); a polyacetal resin; a polyvinyl chloride resin; a polyvinylidene chloride resin; a polyphenylene oxide resin; a polyarylate resin; a polyallyl sulfone resin; a fluorocarbon resin; and a liquid crystalline polymer.

It is preferable that the thermoplastic resin is the polyamide resin, the polycarbonate resin, the polypropylene resin, the polybutylene terephthalate resin and the polyphenylene sulfide resin. In these resins, the polyamide resin and the polycarbonate resin are more preferable on the point of view of exhibiting good compatibility with the laser beam absorbent such as the nigrosine.

The polyamide resin in the present invention refers to a polyamide polymer which has acid amide groups (—CONH—) in the molecular thereof and can be molten by heating. The preferred polyamide resin is the polyamide resin which contains following salts as a constitutional unit (a). The salts are at least one selected from the group consisting of salt made of aliphatic diamine and aromatic dicarboxylic acid and salt made of aromatic diamine and aliphatic dicarboxylic acid. A ratio of the constitutional unit (a) to whole constitutional unit of the polyamide resin is preferably 30% by mole or more, further preferably 40% by mole or more. Further specifically, various polyamide resins such as a lactam polycondensation product, a polycondensation product of diamine and dicarboxylic acid, a polycondensation product of ω-amino carboxylic acid, and a polyamide resin copolymer and blended resin which are made from these. As the lactam which is a raw material for polycondensation of the polyamide resin, for example, ε-caprolactam, enantholactam, capryllactam, lauryllactam, α-pyrrolidone, α-piperidone, ω-laurolactam and the like are included.

As the diamine, the aliphatic diamine such as tetramethylene diamine, pentamethylene diamine, hexamethylene diamine, octamethylene diamine, undecamethylene diamine, dodecamethylene diamine, 2-methyl pentamethylene diamine, (2,2,4- or 2,4,4-) trimethyl hexamethylene diamine, nonamethylene diamine and 5-methyl nonane methylene diamine; alicyclic diamine such as 1,3-bis(aminomethyl)cyclohexane, 1,4-bis(aminomethyl)cyclohexane, 1,3-diamino cyclohexane, 1,4-diamino cyclohexane, 1,3-diaminomethyl-3,5,5-trimethyl cyclohexane, bis(4-aminocyclohexyl)methane, bis(3-methyl-4-aminocyclohexyl)methane, 2,2-bis(4-aminocyclohexyl)propane, bis(aminomethyl)decalin, bis(aminomethyl)tricyclodecane, bis(aminopropyl)piperazine and aminoethyl piperazine; the aromatic diamine such as metaxylylene diamine (MXDA), paraxylylene diamine, paraphenylene diamine, bis(4-aminophenyl)ether and bis(aminomethyl)naphthalene are included.

As the dicarboxylic acid, the aliphatic dicarboxylic acid such as adipic acid, suberic acid, azelaic acid, sebacic acid, dodecanedioic acid, glutaric acid, pimelic acid, undecanedioic acid, dodecanedioic acid, hexadecanedioic acid, hexadecenedioic acid, eicosanedioic acid, diglycolic acid, 2,2,4-trimethyl adipic acid and the like; alicyclic dicarboxylic acid such as 1,4-cyclohexane dicarboxylic acid and the like; the aromatic dicarboxylic acid such as terephthalic acid, isophthalic acid, 2-chloroterephthalic acid, 2-methylterephthalic acid, 5-methylisophthalic acid, 5-sulfoisophthalic acid mono sodium salt, hexahydroterephthalic acid, hexahydroisophthalic acid, xylylene dicarboxylic acid and the like are included.

As the ω-amino carboxylic acid, 6-aminocaproic acid, 11-aminoundecanoic acid, 12-amino dodecanoic acid, p-amino methyl benzoic acid, 2-chloro-p-amino methyl benzoic acid, 2-methyl-p-amino methyl benzoic acid and the like are included.

As the polyamide resin, polyamide 6, polyamide 66, polyamide 46, polyamide 11, polyamide 12, polyamide 69, polyamide 610, polyamide 612, polyamide 96, amorphous polyamide, high melting point polyamide, polyamide RIM, polyamide 4, polyamide 61, polyamide 56, polyamide 6T, polyamide 9T, polyamide MDX6, polyamide MP6, polyamide MP10, and a copolymer made from two or more kinds thereof are included. As the copolymer, specifically, a polyamide 6/66 copolymer, a polyamide 6/66/610 copolymer, a polyamide 6/66/11/12 copolymer, a crystalline polyamide/amorphous polyamide copolymer are included. Further, the polyamide resin may be a mixed polymer of the polyamide resin and another synthetic resin. Examples of the mixed polymer are a polyamide/polyester mixed polymer, a polyamide/polyphenyleneoxide mixed polymer, a polyamide/polycarbonate mixed polymer, a polyamide/polyolefin mixed polymer, a polyamide/styrene/acrylonitrile mixed polymer, a polyamide/acrylic acid ester mixed polymer and a polyamide/silicone mixed polymer. These polyamide resins may be used individually or may be used by mixing two or more kinds thereof.

The polyphenylene sulfide (PPS) resin is a polymer mainly having repeated units of thiophenylene group represented by (—ϕ—S—) [ϕ is a phenylene group having substitutional groups or no substitutional group]. The PPS resin is produced through polymerizing a monomer synthesized by reacting p-dichlorobenzene and alkali sulfide at a high temperature and high pressure. The PPS resin is broadly classified into two types. One type is a straight-chained type which is produced through only a polymerization process using an auxiliary initiator so as to have a desired polymerization degree. The other type is a cross-linking type which is produced through heat-crosslinking a polymer having low molecular weight under presence of oxygen. In particular, the PPS resin of the straight-chained type is preferable because the transmissivity thereof is superior. Melting viscosity of the PPS resin is not intended to be limited as long as kneading with melting can be performed. Generally, the melting viscosity is preferably in range from 5 to 2000 Pa·s, more preferably from 100 to 600 Pa·s.

The PPS resin may be a polymer alloy. Examples of the polymer alloy are a PPS/polyolefin-based alloy, a PPS/polyamide-based alloy, a PPS/polyester-based alloy, a PPS/polycarbonate-based alloy, a PPS/polyphenylene ether-based alloy, a PPS/liquid crystal polymer-based alloy, a PPS/polyimide-based alloy and a PPS/polysulfone-based alloy. The PPS resin has chemical resistance, heat resistance and high strength and so it is preferably used for electronic parts, automotive parts and the like.

Examples of the polyester resin are the polyethylene terephthalate resin that is prepared by condensation polymerization reaction of terephthalic acid and ethylene glycol, and the polybutylene terephthalate resin that is prepared by condensation polymerization reaction of terephthalic acid and butylene glycol. Examples of another polyester resin are copolymers of which a part of a terephthalic acid component and/or a part of a glycol component is substituted with a substituent group such as an alkyl group having 1 to 4 carbon atoms. In the terephthalic acid component, the substituent group is 15% by mole or less (e.g. 0.5 to 15% by mole), preferably 5% by mole or less (e.g. 0.5 to 5% by mole), and/or in the glycol component such as the ethylene glycol and the butylene glycol, the substituent group is 15% by mole or less (e.g. 0.5 to 15% by mole), preferably 5% by mole or less (e.g. 0.5 to 5% by mole). The polyester resin may be used individually or may be used by mixing two or more kinds thereof.

As the dicarboxylic acid compound composing the polyester resin, specifically, the aromatic dicarboxylic acid or ester-formability derivatives thereof are preferably used. Examples of the aromatic dicarboxylic acid are terephthalic acid, isophthalic acid, orthophthalic acid, 1,5-naphthalene dicarboxylic acid, 2,5-naphthalene dicarboxylic acid, 2,6-naphthalene dicarboxylic acid, biphenyl-2,2'-dicarboxylic acid, biphenyl-3,3'-dicarboxylic acid, biphenyl-4,4'-dicarboxylic acid, diphenyl ether-4,4'-dicarboxylic acid, diphenyl methane-4,4'-dicarboxylic acid, diphenyl sulfone-4,4'-dicarboxylic acid, diphenyl isopropyliden-4,4'-dicarboxylic acid, 1,2-bis(phenoxy)ethane-4,4'-dicarboxylic acid, anthracene-2,5-dicarboxylic acid, anthracene-2,6-dicarboxylic acid, p-terphenylene-4,4'-dicarboxylic acid, pyridine-2,5-dicarboxylic acid and so on. The terephthalic acid is preferably used. These dicarboxylic acids may be used by mixing two or more kinds thereof. As publicly known, dimethyl ester etc. other than free acid may be used for the polycondensation reaction as the ester-formability derivatives. Incidentally, one or more kinds of the aliphatic dicarboxylic acid and/or the alicyclic dicarboxylic acid are mixed and may be used together with the aromatic dicarboxylic acid as long as amounts thereof are a little. Examples of the aliphatic dicarboxylic acid are adipic acid, azelaic acid, dodecanedioic acid, sebacic acid and the like. Examples of the alicyclic dicarboxylic acid are 1,2-cyclohexane dicarboxylic acid, 1,3-cyclohexane dicarboxylic acid, 1,4-cyclohexane dicarboxylic acid and the like.

As a dihydroxy compound composing the polyester resin, aliphatic diol, alicyclic diol, a mixture thereof and the like are exemplified. Examples of the aliphatic diol are ethylene glycol, propylene glycol, butane diol, hexylene glycol, neopentyl glycol, 2-methylpropane-1,3-diol, diethylene glycol, triethylene glycol and the like. Examples of the alicyclic diol are cyclohexane-1,4-dimethanol and the like. Incidentally, one or more kinds of long-chained diol having molecular weight of 400 to 6000 may be copolymerized as long as an amount thereof is a little. Examples of the long-chained diol are polyethylene glycol, poly-1,3-propylene glycol, polytetramethylene glycol and the like. Further, aromatic diol such as hydroquinone, resorcin, naphthalene diol, dihydroxydiphenyl ether, 2,2-bis(4-hydroxyphenyl)propane and the like may be used. In order to introduce a branched structure, a trifunctional monomer other than the above bifunctional monomer may be slightly used together therewith. Examples of the trifunctional monomer are trimellitic acid, trimesic acid, pyromellitic acid, pentaerythritol, trimethylolpropane and the like. In order to adjust molecular weight, a monofunctional compound such as aliphatic acid etc. may be slightly used together therewith.

The polyester resin mainly containing a polycondensation product of the dicarboxylic acid and the diol is used. The polycondensation product is contained in 50% by mass or more, preferably 70% by mass or more of the whole polyester resin. The preferred dicarboxylic acid is the aromatic dicarboxylic acid. The preferred diol is the aliphatic diol. 95% by mass or more in an acid component is more preferably the terephthalic acid. 95% by mass or more in an alcoholic component is more preferably polyalkylene terephthalate which is the aliphatic diol. Examples thereof are polybutylene terephthalate and polyethylene terephthalate. The polyester resin which is almost homo-polyester is preferable. That is, 95% by mass or more in the whole resin is the terephthalic acid component and 1,4-butanediol or the ethylene glycol component. The polyester resin mainly based on the polybutylene terephthalate is preferable. The polybutylene terephthalate may be a copolymer of polyalkylene glycol such as the isophthalic acid, dimer acid, the polytetramethylene glycol (PTMG) and the like.

As the polyolefin-based resin, examples thereof are a homopolymer of α-olefin and a copolymer thereof, and a copolymer of these polymers and another unsaturated monomer capable of copolymerization etc. (the copolymer may be a block copolymer, a random copolymer and a graft copolymer.) Examples of the α-olefin are ethylene, propylene, butene-1,3-methylbutene-1,4-methylpentene-1 and octene-1. More specifically, examples of the polyethylene-based resin are high density polyethylene, medium density polyethylene, low density polyethylene, linear low density polyethylene, an ethylene-vinyl acetate copolymer, an ethylene-ethyl acrylate copolymer and the like. Examples of the polypropylene-based resin are a polypropylene homopolymer, a propylene-ethylene block copolymer or a random copolymer thereof, a propylene-ethylene-butene-1 copolymer and the like. Further, polybutene-1 and poly 4-methyl-pentene-1 are exemplified. These polyolefin-based resins may be used individually or may be used by combining with two or more kinds thereof. Among these, the polyethylene resin and/or the polypropylene resin are preferably used. The polypropylene-based resin is more preferable. Molecular weight of the polypropylene-based resin is not intended to be restricted. The polypropylene type resin having the molecular weight in a wide range may be used.

Incidentally, as the polyolefin-based resin, acid-modified polyolefin which is a modified product by unsaturated carboxylic acid or the derivatives thereof and a foam resin which contains a foaming agent and is like foam polypropylene may be used. The polyolefin-based resin may contain rubbers such as ethylene-α-olefin-based copolymer rubber, an ethylene-α-olefin-nonconjugated diene-based compound copolymer (e.g. EPDM etc.), ethylene-aromatic monovinyl compound-conjugated-based diene compound copolymer rubber or hydrogenated compound etc. of the above.

The polycarbonate resin is the thermoplastic resin having carbonic ester bonds in a main chain thereof. The polycarbonate resin is an engineering plastic having an excellent mechanical properties, heat resistance, cold resistance, electrical properties and transparency. The polycarbonate resin which is industrially produced in present is aromatic polycarbonate made from bisphenol A. As a method for producing it, a phosgene process and a transesterification process may be included. A chemical structure formula of the polycarbonate resin has bulky benzene nuclei and flexible carbonates at a molecular main chain in a straight-chained molecular of which multiple carbonate esters are numerously connected. The former brings a high thermal-deformation temperature and excellent physical and mechanical properties. The latter contributes formability and bendability but it is susceptible to hydrolysis by alkali.

The thermoplastic resin is not only the above resins but also may be a copolymer resin consisting of two or more monomers. For example, AS (acrylonitrile-styrene) copolymer resin, an ABS (acrylonitrile-butadiene-styrene) copolymer resin, an AES (acrylonitrile-EPDM-styrene) copolymer resin, a PA-PBT copolymer resin, a PET-PBT copolymer resin, a PC-PBT copolymer resin, a PC-PA copolymer resin and the like are exemplified. In addition, a thermoplastic elastomer such as a polystyrene-based thermoplastic elastomer, a polyolefin-based thermoplastic elastomer, a polyurethane-based thermoplastic elastomer and a polyester-based thermoplastic elastomer; synthetic wax or natural wax etc. that contains the above-mentioned resins as the main component are exemplified. Incidentally, molecular weight of the thermoplastic resins is not intended to be restricted. As the thermoplastic resin, the above-mentioned resin may be used individually or two or more kinds thereof.

A laser-transmissible resin composition used for forming the laser-transmissible resin member 1 may be water-white or alternatively may show pale gray color by containing the nigrosine in a minute amount. A laser-weakly-absorptive resin composition used for the laser-weakly-absorptive resin member 2 and a laser-absorptive resin composition used for forming the laser-absorptive resin member 3 which are the parts of the laser-welded body 10 may preferably contain the black coloring agent. The nigrosine in a comparatively small amount is preferably contained in these resin compositions on the point of the view of which an object to adjust to a specific absorbance has priority rather than an object to color black color. The nigrosine is used for defining the laser beam transmittivity of these resin members and laser beam absorbability thereof. Thus, these resin compositions contain the nigrosine in a content needed to adjust the laser beam transmittivity and the laser beam absorbability. Thereby, the laser-weakly-absorptive resin member 2 having the low absorbance insufficiently has a jet-black degree. When these resin members are colored the black color without depending on the nigrosine, the black coloring agent having the laser beam transmittivity is used. The color tone of these resin members may be adjusted.

In order to intend an object to diminish a welding mark and a boundary between the respective resin members 1, 2, 3 in the laser-welded body 10, the coloring agents may be added into the respective resin compositions for forming the respective resin members 1, 2, 3. Thereby, for example, the respective resin members 1, 2, 3 may be colored in single color tone of the black color. The respective resin members 1, 2, 3 having the homogeneous black color is obtained by adding suitable coloring agents depend on a color hue and color concentration. The black coloring agent is obtained by a combination with a blue coloring agent, a red coloring agent and a yellow coloring agent, a combination with a violet coloring agent and the yellow coloring agent and/or a combination with a green coloring agent and the red coloring agent.

As the coloring agent added into the respective resin compositions which are raw materials of the respective resin members 1, 2, 3, a combination with dyes which has a visible light absorptivity, a rich compatibility with the thermoplastic resin and low scattering properties with respect to the laser beam is included. The preferred coloring agent is difficult to bleach by a high temperature generated at the time of molding the laser-transmissible resin member 1 and by a high temperature generated at the time of melting due to irradiating with the laser beam; has excellent heat resistance; and has non-absorptivity with respect to a near-infrared region of the laser beam. Specifically, the coloring agent containing at least an anthraquinone dye which has transmittivity with respect to the laser beam used for the laser-welding is preferable.

The anthraquinone dye is preferably an anthraquinone-based oil soluble dye. For example, the dyes represented by Color Index are commercially available, specifically as follows: C.I. Solvent Blue 11, 12, 13, 14, 26, 35, 36, 44, 45, 48, 49, 58, 59, 63, 68, 69, 70, 78, 79, 83, 87, 90, 94, 97, 98, 101, 102, 104, 105, 122, 129 and 132; C.I. Disperse Blue 14, 35, 102 and 197; C.I. Solvent Green 3, 19, 20, 23, 24, 25, 26, 28, 33 and 65; and C.I. Solvent Violet 13, 14, 15, 26, 30, 31, 33, 34, 36, 37, 38, 40, 41, 42, 45, 47, 48, 51, 59 and 60.

The anthraquinone dye having a maximum absorption wavelength in range from 590 to 635 nm is exemplified. The anthraquinone dye exhibits often a blue color and has a high visibility as compared with a green anthraquinone dye. When mixed black coloring agents are prepared by combining, a red dye and/or a yellow dye is combined with a blue anthraquinone dye by subtractive color mixing. The coloring agent of the black color having a high colorability is obtained.

The anthraquinone dye preferably has transmittance of 60 to 95% with respect to the 940 nm laser beam. As the anthraquinone dye which is commercially available, for example, "NUBIAN (registered trademark) BLUE series" and "OPLAS (registered trademark) BLUE series" (all are tradenames, available from ORIENT CHEMICAL INDUSTRIES CO., LTD.) are exemplified.

Preferred electrical conductivity of the anthraquinone dye is 50 to 500 μS/cm. Thereby, since the insulation of the respective resin members 1, 2, 3 is increased, the laser-welded body 10 is suitably used for resin parts such as parts for electrical and electronic apparatus and parts for precision apparatus which require the high insulation.

The electrical conductivity is measured as follows. The anthraquinone dye as a sample in an amount of 5 g is dispersed to 500 mL of ion-exchange water, followed by recording weight thereof. An ion component is extracted by boiling the ion-exchange water to which the anthraquinone dye has been dispersed, followed by filtrating it. Ion-exchange water is added to the resultant filtrate until weight thereof is same as the preliminarily measured weight. The electrical conductivity of this solution is measured by using an electrical conductivity meter (manufactured by DKK-TOA CORPORATION, tradename: AOL-10).

As a mixed coloring agent, a combination with a blue dye, the red dye and the yellow dye, a combination with a green dye and the red dye, and a combination with the blue dye, the green dye, the red dye and the yellow dye are exemplified. As the red dye or the yellow dye used for the mixed coloring agent, azo dye, a quinacridone dye, a dioxazine dye, a quinophthalone dye, a perylene dye, a perinone dye, an isoindolinone dye, an azomethine dye, a triphenylmethane dye and the anthraquinone dye are exemplified. These dyes may be used as individual or two or more dyes in combination. As the dye which imparts good coloring to the resin composition, the perinone dye and the anthraquinone dye are exemplified.

A combination of the above anthraquinone dye having the maximum absorption wavelength in range from 590 to 635 nm and the red dye are preferably used. As a suitable example, the perinone dye is exemplified. The perinone dye has the good heat resistance and exhibits often a red color. As the red dye which is commercially available, for example, "NUBIAN (registered trademark) RED series" and "OPLAS (registered trademark) RED series" (all are tradenames, available from ORIENT CHEMICAL INDUSTRIES CO., LTD.) are exemplified.

Examples of the perinone dye are specifically C.I. Solvent Orange 60; C.I. Solvent Red 135, 162, 178 and 179.

Examples of the anthraquinone dye (including the anthrapyridone dye) are C.I. Solvent Red 52, 111, 149, 150, 151, 168, 191, 207 and 227; C.I. Disperse Red 60. The perinone dye and the anthraquinone dye are represented by Color Index and are commercially available.

A preferred dye adapted to be combined with the anthraquinone dye is a yellow anthraquinone dye. In the coloring agent, a range of a mass ratio (i)/(ii) of (i) a mass of the yellow anthraquinone dye/(ii) a mass of the blue, green and/or violet anthraquinone dyes is preferably 0.15 to 1.0. As a commercially available product of the yellow anthraquinone dye, for example, "NUBIAN (registered trademark) YELLOW series" and "OPLAS (registered trademark) YELLOW series" (all are tradenames, available from ORIENT CHEMICAL INDUSTRIES CO., LTD.) are exemplified.

Examples of the yellow dye include dyes represented by following Color Index: C.I. Solvent Yellow 14, 16, 32, 33, 43, 44, 93, 94, 98, 104, 114, 116, 133, 145, 157, 163, 164, 167, 181, 182, 183, 184, 185, and 187; C.I. Vat Yellow 1, 2 and 3. These are commercially available.

When robustness such as weather fastness, heat resistance and resistance to bleed are needed to the laser-welded body 10, a salt-forming dye which is a combination of an acid dye with organic amine is preferably used as the above oil soluble dye. The salt-forming dye may be represented by [anion of the acid dye•organic ammonium salt]. In the coloring agent, the anthraquinone dye is substituted with the salt-forming dye, and an anthraquinone-based salt-forming dye represented by such as [anion of an anthraquinone acid dye•organic ammonium salt] are employed. Thereby, the robustness of the coloring agent is increased.

Examples of the anthraquinone acid dye used for the salt-forming dye include the anthraquinone dye which has a single sulfonic acid group in a single molecule and is represented by following Color Index: especially C.I. Acid Blue 25, 27, 40, 41, 43, 45, 47, 51, 53, 55, 56, 62, 78, 111, 124, 129, 215, 230 and 277; C.I. Acid Green 37; and C.I. Acid Violet 36, 41, 43, 51 and 63. These are commercially available.

Examples of the anthraquinone acid dye other than those above include the anthraquinone dye which has two sulfonic acid groups in a single molecule of anthraquinone, and is represented by following Color Index: especially C.I. Acid Blue 23 35, 49, 68, 69, 80, 96, 129: 1, 138, 145, 175, 221 and 344; C.I. Acid Green 25, 27, 36, 38, 41, 42 and 44; and C.I. Acid Violet 34 and 42. These are commercially available.

The preferred anthraquinone acid dye has a structure of which a substituent group having a sulfonic acid group is bonded to an anilino group. This structure is included in an anthraquinone molecular scaffold as at least one of a substituent group. Among others, C.I. Acid Blue 49, 80, 96, 129: 1, 138, 145 and 221; C.I. Acid Green 25, 27, 36, 38, 41, 42 and 44; and C.I. Acid Violet 34 are exemplified.

An example of the preferred salt-forming dye of the anthraquinone is an anthraquinone salt-forming dye having anilino group derivatives as the substituent group. The anthraquinone salt-forming dye exhibits the high compatibility relative to an aromatic thermoplastic resin and imparts the high heat resistance relative thereto.

The preferred anthraquinone dye is represented by the following formula (1):

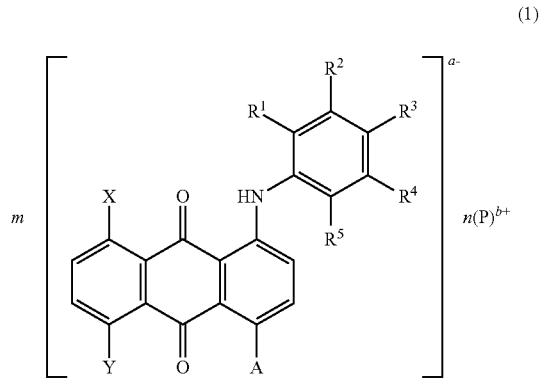

(in the formula (1), X and Y are independently a hydrogen atom, a hydroxy group, a halogen atom or an amino group; $R^1$ to $R^5$ are independently a hydrogen atom, a hydroxy group, an amino group, a nitro group, a straight or branched alkyl group having 1 to 18 carbon atoms, a straight or branched alkoxy group having 1 to 18 carbon atoms, a halogen atom, a phenyloxy group or a carboxy group; $(P)^{b+}$ is an organic ammonium ion; a and b are 1 to 2 positive numbers; m and n are 1 to 2 positive numbers; A is a hydrogen atom, a hydroxy group, an amino group, a halogen atom or a group represented by following the formula (2):

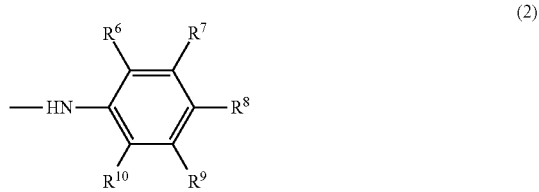

(2)

(in the formula (2), $R^6$ to $R^{10}$ are independently a hydrogen atom, a hydroxy group, an amino group, a nitro group, a straight or branched alkyl group having 1 to 18 carbon atoms, a straight or branched alkoxy group having 1 to 18 carbon atoms, or a halogen atom.)).

In the formulas (1) and (2), examples of the straight or branched alkyl group having 1 to 18 carbon atoms are specifically a methyl group, an ethyl group, a n-propyl group, an isopropyl group, a n-butyl group, a sec-butyl group, an isobutyl group, a tert-butyl group, a n-pentyl group, a neopentyl group, an isopentyl group, a sec-pentyl group, a 3-pentyl group, a tert-pentyl group, a hexyl group, a heptyl group and an octyl group. Examples of the straight or branched alkoxy group having 1 to 18 carbon atoms are specifically a methoxy group, an ethoxy group, a n-propoxy group, an isopropoxy group, a n-butoxy group, a sec-butoxy group, an isobutoxy group, a tert-butoxy group, a n-pentyloxy group, a neopentyloxy group, an isopentyloxy group, a sec-pentyloxy group, a 3-pentyloxy group, a tert-pentyloxy group and a hexyloxy group. Examples of the halogen atom are specifically fluorine, chlorine, bromine and iodine.

The preferred salt-forming dye represented by the formula (1) is the anthraquinone salt-forming dye having two anilino group derivatives as a substituent in a single molecule. Thereby, heat degradation of the respective resin members 1, 2, 3 due to thermal fusion is prevented at the time of molding and laser-welding these. The anthraquinone acid dye is suitable for the salt-forming dye. Examples of the anthraquinone acid dye having the two anilino group derivatives as a substituent in a single molecule are specifically C.I. Acid Green 25, 27, 36, 38, 41, 42 and 44; C.I. Acid Blue 80 and 221; and C.I. Acid Violet 34.

Examples of preferred amines used for the salt-forming dye represented by the formula (1) are aliphatic monoamine such as hexylamine, pentylamine, octylamine, 2-ethyl hexylamine, di-(2-ethylhexyl)amine and dodecylamine; alicyclic amine such as cyclohexylamine, dicyclohexylamine and dihydroaziethylamine; aliphatic, alicyclic or aromatic diamine such as tetramethylenediamine, hexamethylenediamine, octamethylenediamine, nonamethylenediamine, dodecamethylenediamine, 2-methylpentamethylenediamine, 2-methyloctamethylenediamine, trimethylhexamethylenediamine, bis(p-aminocyclohexyl)methane, m-xylenediamine and p-xylenediamine; alkoxy alkyl amine such as 3-propoxypropylamine, di-(3-ethoxypropyl)amine, 3-butoxypropylamine, octooxypropylamine and 3-(2-ethylhexyloxy)propylamine; aromatic amine such as α-naphthylamine, β-naphthylamine, 1,2-naphthylenediamine, 1,5-naphthylenediamine and 1,8-naphthylenediamine; aromatic alkyl amine such as 1-naphthylmethylamine; amine containing an alkanol group such as N-cyclohexylethanolamine, N-dodecylethanolamine and N-dodecylimino-diethanol; guanidine derivatives such as 1,3-diphenylguanidine, 1-o-tolylguanidine and di-o-tolylguanidine.

As the amines, commercially available quaternary ammonium may be employed. Examples of the quaternary ammonium are specifically QUARTAMIN 24P, QUARTAMIN 86P conc., QUARTAMIN 60W, QUARTAMIN 86W, QUARTAMIN D86P (distearyldimethylammonium chloride), SANISOL C and SANISOL B-50, (as above, available from Kao Corporation, QUARTAMIN and SANISOL are registered trademark.); ARQUAD 210-80E, 2C-75, 2HT-75 (dialkyl (alkyl is $C_{14}$ to $C_{18}$) dimethylammonium chloride), 2HT flake, 20-75I, 2HP-75 and 2HP flake (as above, available from LION SPECIALTY CHEMICALS CO., LTD., ARQUAD is tradename); PRIMENE MD amine (methanediamine), PRIMENE 81-R (a mixture of hyper-branched tert-alkyl ($C_{12}$ to $C_{14}$) primary amine isomers), PRIMENE TOA amine (tert-octylamine), PRIMENE RB-3 (a mixture of tert-alkyl primary amine) and PRIMENE JM-T amine (a mixture of hyper-branched chain tert-alkyl ($C_{16}$ to $C_{22}$) primary amine isomer) (as above, available from Dow Chemical Company, PRIMENE is registered trademark).

An amount of the coloring agent is 0.01 to 3 parts by mass, preferably 0.05 to 1 parts by mass and more preferably 0.1 to 0.8 parts by mass with respect to 100 parts by mass of the thermoplastic resin. When the amount of the coloring agent is adjusted to be the above range, the resin composition having high coloring is obtained.

When preparing the resin composition, it is preferable that a masterbatch containing the coloring agent is prepared, and then the masterbatch is added into a thermoplastic resin raw material. Thereby, the resin composition has no irregular color because the coloring agent is homogeneously dispersed. A content of the coloring agent in the masterbatch is preferably 5 to 90% by mass and more preferably 20 to 60% by mass.

Incidentally, when a raw material composition of the laser-transmissible resin member 1 contains no laser beam absorbent or a small amount of the laser beam absorbent, the laser-transmissible resin member 1 can be not only achromatic but also can be a chromatic member. For example, the laser-transmissible resin member 1 can be colored in yellow, red, blue, green and violet colors by using the above-exemplified coloring agent.

As needed, various additives may be blended into a raw material of the thermoplastic resin beside the coloring agent when the resin compositions which are the raw material of the respective resin members 1, 2, 3 are prepared. Examples of the additive are a reinforcer, a filler, an ultraviolet-absorptive agent or a light-stabilizer, an antioxidant, an antibacterial agent, a fungicide, a flame retardant, an auxiliary coloring agent, a dispersant, a stabilizer, a plasticizer, a reforming agent, an antistatic agent, a lubricant, a mold release agent, a crystallization accelerator and a crystal nucleating agent. Further, a white pigment and an organic white pigment such as titanium oxide, zinc sulfate, zinc white (zinc oxide), calcium carbonate and alumina white are exemplified. Thereby, the achromatic raw material of the thermoplastic resins is adjusted so as to have a chromatic color by a combination of the organic dyes and with the organic pigments.

The reinforcer is freely selected as long as a product can be used for reinforcing a synthetic resin. Examples of the reinforcer are an inorganic fiber such as a glass fiber, a carbon fiber, a metal fiber, a calcium titanate fiber, a calcium silicate fiber, sepiolite, wollastonite and rock wool; and an organic fiber such as aramid, a polyphenylene sulfide resin, polyamide, polyester and liquid crystalline polymer. For example, when a transparency will be imparted to the resin member, the glass fiber is suitable for reinforcing it. A fiber length of the glass fiber is 2 to 15 mm, and a fiber diameter thereof is 1 to 20 µm. A type of the glass fiber is freely selected, and a roving fiber and a milled fiber are exemplified. The glass fiber may be used individually or two or more kinds of the glass fiber may be used in combination. A content thereof is preferably 5 to 120 parts by mass with respect to 100 parts by mass of the laser-transmissible resin member 1. If it is less than 5 parts by mass, a reinforcing effect by the glass fiber is insufficiently exhibited. If it is higher than 120 parts by mass, moldability is decreased. The amount thereof is preferably 10 to 60 parts by mass, more preferably 20 to 50 parts by mass.

As the filler, a particulate filler is exemplified. Examples of the particulate filler are silicate such as talc, kaolin, clay, wollastonite, bentonite, asbestos and alumina silicate; metal oxide such as alumina, silicon oxide, magnesium oxide, zirconium oxide and titanium oxide; carbonate such as calcium carbonate, magnesium carbonate and dolomite; sulfate such as calcium sulfate and barium sulfate; ceramics such as glass beads, ceramic beads, boron nitride and silicon carbide. In addition, the filler may be a plate-like filler such as mica, sericite and glass flake.

Examples of the ultraviolet-absorptive agent and the light-stabilizer include a benzotriazole-based compound, a benzophenone-based compound, a salicylate-based compound, a cyanoacrylate-based compound, a benzoate-based compound, an oxanilide-based compound, a hindered amine-based compound, a nickel complex salt and the like.

Examples of the antioxidant include as follows: a phenol compound having a phenolic hydroxyl group; a phosphoric antioxidant having a phosphorus atom such as triphenyl phosphite, diphenyldecyl phosphite, phenyldiisodecyl phosphite, tri(nonylphenyl) phosphite, bis(2,4-di-tert-butylphenyl)pentaerythritol diphosphite, bis(2,6-di-tert-butyl-4-methylphenyl)pentaerythritol diphosphite and the like; a sulfuric antioxidant and a thioetheric antioxidant having a sulfur atom such as didodecyl thiodipropionate, ditetradecyl thiodipropionate, dioctadecyl thiodipropionate, pentaerythritol tetrakis(3-dodecylthiopropionate), thiobis(N-phenyl-(β-naphthylamine), 2-mercaptobenzothiazole, 2-mercaptobenzoimidazole, tetramethylthiuram monosulfide, tetramethylthiuram disulfide, nickel dibutyldithiocarbamate, nickel isopropylxanthate, trilauryl trithiophosphite and the like.

Examples of the antibacterial agent and the fungicide include 2-(4'-thiazolyl)benzimidazole, 10,10'-oxibisphenoxyarsine, N-(fluorodichloromethylthio)phthalimide, bis(2-pyridylthio-1-oxide) zinc and the like.

The flame retardant is freely selected. Examples thereof include an organic flame retardant and an inorganic flame retardant such as an organic halogen compound, an antimony compound, a compound having silicon, a phosphorus compound, a nitrogen compound and the like. Examples of the organic halogen compound include brominated polycarbonate, a brominated epoxy resin, a brominated phenoxy resin, a brominated polyphenylene ether resin, a brominated polystyrene resin, brominated bisphenol A, pentabromobenzyl polyacrylate, tetrabromobisphenol A derivatives, hexabromodiphenyl ether, tetrabromophthalic anhydride and the like. Examples of the antimony compound include antimony trioxide, antimony pentaoxide, sodium antimonate, antimony phosphate and the like. Further examples of the compound having silicon include silicone oil, organosilane and aluminum silicate. Examples of the phosphorus compound include triphenyl phosphate, triphenyl phosphite, phosphoric ester, polyphosphoric acid, ammonium polyphosphate, red phosphorus and a phosphazene compound, which has a main chain including a bond of a phosphorus atom and a nitrogen atom, such as phenoxyphosphazene and amino phosphazene and the like. Examples of the nitrogen compound include melamine, cyanuric acid, melamine cyanurate, urea, guanidine and the like. Examples of the inorganic flame retardant include the aluminum hydroxide, magnesium hydroxide, a silicon compound, a boron compound and the like.

The plasticizer is freely selected. Examples of the plasticizer include phthalate ester (e.g. dimethyl phthalate, butyl benzyl phthalate, diisodecyl phthalate and the like), phosphoric ester (e.g. tricresyl phosphate and 2-ethylhexyl diphenyl phosphate), sulfonamide-based plasticizers (e.g. n-butylbenzene sulfonamide, p-toluene sulfonamide and the like). Furthermore, polyester-based plasticizers, polyhydric alcohol ester-based plasticizers, polycarboxylic ester-based plasticizers, bisphenol-based plasticizers, amide-based plasticizers, ester-based plasticizers, amide ester-based plasticizers, glycerin-based plasticizers, epoxy-based plasticizers (e.g. epoxy triglyceride consisting of epoxy-stearic alkyl and soybean oil) and the like are exemplified.

The impact modifier is freely selected as long as an impact modifying effect of the resin is exhibited. Publicly known products such as a polyamide-based elastomer, a polyester-based elastomer, a styrene-based elastomer, a polyolefin-based elastomer, an acryl-based elastomer, a polyurethane-based elastomer, a fluorine-based elastomer, a silicone-based elastomer and an acryl core/shell type elastomer etc. are exemplified. Especially, the polyester-based elastomer and the styrene-based elastomer are preferable.

The respective resin members 1, 2, 3 may be produced by using the masterbatch of any thermoplastic resin composition which is colored. The masterbatch is obtained through any method. For example, the masterbatch is produced as follows. A powder and/or pellets of the base resin of the masterbatch and the coloring agent are mixed by using a mixing machine such as a tumbler and a super mixer. The resultant mixture is heated and melted by using an extruder, a batch-type kneader or a roll-type kneader, and is pelletized or grained to obtain the master batch.

The respective resin members 1, 2, 3 may be molded through various steps which are publicly known. For example, the respective resin members 1, 2, 3 are molded via using the colored pellets by a processing machine such as an extruder, an injection molding machine and a roll mill. Further, the respective resin members 1, 2, 3 may be molded through following steps: obtaining a resin composition through mixing pellets and/or a powder of a transparent thermoplastic resin, a grinded coloring agent and optionally various additives by using a suitable mixer, and molding the obtained resin composition by using the processing machine. Furthermore, the respective resin members 1, 2, 3 may be molded through following steps: adding a coloring agent into a monomer containing a suitable catalyst for copolymerization; synthesizing any resin by polymerizing the resultant mixture; and molding the resultant resin by a suitable method. As a molding method, following methods may be employed: injection molding, extrusion molding, compression molding, foam molding, blow molding, vacuum molding, injection blow molding, rotation molding, calender molding, solution casting and the like. By employing the above molding, the respective resin members 1, 2, 3 which are variously shaped may be obtained.

EMBODIMENTS

Embodiments of the present invention will be described in detail below, but the scope of the present invention is not restricted to these embodiments.

(Preparing a Black Coloring Agent Having Laser Beam Transmissivity)

[Coloring agent A] Coloring agent A was obtained by powder-mixing a blue salt-forming dye of an anthraquinone blue acid dye (C.I. Acid Blue 80) and hexamethylenediamine, and a perinone red color oil soluble dye (C.I. Solvent Red 179) at a mass ratio of 1:2.

[Coloring agent B] Coloring agent B was obtained by powder-mixing a blue salt-forming dye of the anthraquinone blue acid dye (C.I. Acid Blue 80) and 2-ethylhexylamine, the perinone red color oil soluble dye (C.I. Solvent Red 179) and C.I. Solvent Yellow 163 at a mass ratio of 7:2:1.

[Coloring agent C] Coloring agent C was obtained by powder-mixing a blue salt-forming dye of an anthraquinone blue acid dye (C.I. Acid Blue 236) and 2-ethylhexylamine, the perinone red color oil soluble dye (C.I. Solvent Red 179) and C.I. Solvent Yellow 163 at a mass ratio of 6:3:1.

[Coloring agent D] Coloring agent D was obtained by powder-mixing an anthraquinone blue color oil soluble dye (C.I. Solvent Blue 104), the perinone red color oil soluble dye (C.I. Solvent Red 179) and an anthraquinone yellow color oil soluble dye (C.I. Solvent Yellow 163) at a mass ratio of 5:3:2.

EXAMPLE 1

(1) Preparing a Laser-transmissible Resin Member 1 (A First Resin Member)

A polyamide 66 resin (available from Asahi Kasei Corp., LEONA (registered trademark) 1300S) in an amount of 500 g was shaped into one laser-transmissible resin member 1 having a size of 80 mm longitudinal length×50 mm lateral length×1 mm thickness in the usual manner at 290° C. of a cylinder temperature and 80° C. of a mold temperature by using an injection molding machine (manufactured by TOYO MACHINERY & METAL CO., LTD., tradename: Si-50).

(2) Preparing a Laser-weakly-absorptive Resin Member 2 (A Second Resin Member)

The polyamide 66 resin (available from Asahi Kasei Corp., LEONA (registered trademark) 1300S) in an amount of 499.8 g and 0.2 g of Nigrosine A (nigrosine sulfate synthesized by modifying a sulfate ion concentration in accordance with the description of Japanese Patent Publication No. 3757081; sulfate ion 1.96% by mass; volume resistivity $2.0 \times 10^{10}$ Ω·cm; C.I. Solvent Black 5) were put in a tumbler made of stainless steel, followed by stirring and mixing them for 1 hour. A resin composition for a laser-weakly-absorptive resin member 2 was prepared. The resultant resin composition was shaped into each one of a resin member piece 2f and a resin member piece 2s having a size of 80 mm longitudinal length×50 mm lateral length×1 mm thickness in the usual manner at 290° C. of a cylinder temperature and 80° C. of a mold temperature by using an injection molding machine (manufactured by TOYO MACHINERY & METAL CO., LTD., tradename: Si-50). The resin member piece 2f and the resin member piece 2s were used as a laser-weakly-absorptive resin member 2.

(3) Preparing a Laser-Absorptive Resin Member 3 (A Third Resin Member)

The polyamide 66 resin (available from Asahi Kasei Corp., LEONA (registered trademark) 1300S) in an amount of 499.7 g and 0.3 g of Nigrosine A (nigrosine sulfate; sulfate ion 1.96% by mass; volume resistivity $2.0 \times 10^{10}$ Ω·cm) were put in a tumbler made of stainless steel, followed by stirring and mixing them for 1 hour. A resin composition for a laser-absorptive resin member 3 was prepared. The resultant resin composition was shaped into one laser-absorptive resin member 3 having a size of 80 mm longitudinal length×50 mm lateral length×1 mm thickness in the usual manner at 290° C. of a cylinder temperature and 80° C. of a mold temperature by using an injection molding machine (manufactured by TOYO MACHINERY & METAL CO., LTD., tradename: Si-50).

Transmittance and reflectance of the molded plates of the laser-weakly-absorptive resin member and the laser-absorptive resin member were measured by using a spectrophotometer (manufactured by JASCO Corporation, tradename: V-570). Usual absorbance measured by dissolving a sample is a positive number calculated from the logarithm of the transmittance. In the present invention, the laser beam is reflected by a face of the molded plate. Therefore, when the absorbance of the molded resin member is measured, true transmittance is needed. The true transmittance T is represented by $T = I_T/(I_O - I_R)$. The Lambert-Beer law representing the absorbance at 940 nm is represented by the following equation (1):

$$\text{Absorbance } a = -\text{Log } T = -\text{Log } \{I_T/(I_O - I_R)\} \quad (1)$$

(in the equation (1), T is the true transmittance; ($I_O$) is incident light intensity; ($I_T$) is transmissive light intensity; and ($I_R$) is reflected light intensity.) Herein, the absorbance was calculated as follows: setting the incident light intensity $I_O$ of 100%; and entering the transmittance and the reflectance which are percentages of measured values into the transmissive light intensity $I_T$ and the reflected light intensity $I_R$, respectively. Incidentally, when the laser-absorptive resin member and the laser-weakly-absorptive resin member composing a laser-welded body of the present invention excessively contains a laser beam absorbent, obtaining the absorbance and absorptivity by measurement may be difficult. Further, according to the Lambert-Beer law, the absorbance a is represented by the following equation (2) which is an equation showing a relationship between a laser beam absorbent content C (% by mass) and a thickness L (mm) of the resin member:

$$\text{Absorbance } a = \varepsilon C L \quad (2)$$

(in the equation (2), $\varepsilon$ is the absorptivity (1/mm); C is the laser beam absorbent content (% by mass); L is the thickness of the resin member (mm).) A calibration curve was made on the basis of Table 1. The absorbance and the absorptivity of these resin members were determined via following calculations.

TABLE 1

| Content of Laser beam absorbent (% by mass) | Transmittance (%) | Reflectance (%) | Thickness of Resin member (mm) | Absorbance a (converted into 1 mm thickness) |
|---|---|---|---|---|
| 0 | 80.3 | 9.6 | 1.05 | 0.05 |
| 0.005 | 77.2 | 10.0 | 1.05 | 0.07 |
| 0.02 | 68.6 | 8.2 | 1.05 | 0.12 |
| 0.03 | 61.8 | 7.6 | 1.02 | 0.18 |

TABLE 1-continued

| Content of Laser beam absorbent (% by mass) | Transmittance (%) | Reflectance (%) | Thickness of Resin member (mm) | Absorbance a (converted into 1 mm thickness) |
|---|---|---|---|---|
| 0.04 | 52.6 | 7.0 | 1.02 | 0.24 |
| 0.06 | 39.2 | 5.9 | 1.05 | 0.36 |
| 0.08 | 32.2 | 5.3 | 1.05 | 0.45 |
| 0.1 | 26.5 | 5.2 | 1.05 | 0.53 |
| 0.15 | 16.1 | 4.7 | 1.05 | 0.74 |
| 0.2 | 9.8 | 4.8 | 1.05 | 0.94 |

A graph was made by plotting the obtained absorbance a along a vertical axis and plotting the laser beam absorbent content C (% by mass) corresponding thereto along a horizontal axis. The calibration curve represented by Absorbance a=4.538 C+0.058 was obtained. In Examples and Comparative examples, by using the equation of the calibration curve, the absorbance was calculated from the laser beam absorbent content (% by mass). The absorbance a per 1 mm thickness of the resin member containing the laser beam absorbent was obtained through dividing the obtained absorbance by the thickness of the resin member. The measurement relative to the respective resin composition was performed in the same manner.

(4) Producing a Laser-Welded Body 10

As shown in FIG. 1, a butted part B was formed by butting and contacting ends of the both resin member pieces 2f, 2s each other. The resin member pieces 2f, 2s were used as the laser-weakly-absorptive resin member 2. The laser-transmissible resin member 1, the laser-weakly-absorptive resin member 2 and the laser-absorptive resin member 3 were overlapped in this order. A three-layered resin member was formed. The three-layered resin member received 0.4 Pa per a unit area of pressure in direction to the thickness thereof. A glass plate (laser beam transmittance was 90%) having 5 mm thickness was put on a face of the laser-transmissible resin member 1. The three-layered resin member was fixed. Thereby a resin members 1, 2, 3 layered body including the butted part B and contacted parts $C_{1-2}$, $C_{2-3}$ was prepared. A laser beam L was output from a diode laser having 10 W output power [wave length: 940 nm, continuously] (manufactured by Hamamatsu Photonics K.K.). Radiation of the laser beam L was performed from an upper direction of the laser-transmissible resin member 1 along the butted part B and the contacted parts $C_{1-2}$, $C_{2-3}$ while scanning. A scan speed of the laser beam L was 0.6 mm/second and a scan distance thereof was 20 mm. In the result, a laser-welded body 10 of Example 1 of which the respective resin members 1, 2, 3 were integrated by welding at the butted part B and the contacted parts $C_{1-2}$, $C_{2-3}$ was obtained. Following evaluations with respect to the laser-welded body 10 were performed.

(Tensile Test)

In accordance with a test process in Japanese Industrial Standard K7161: 2014 Plastics-Determination of tensile properties, tensile strength was measured by using a tensile tester (manufactured by SHIMADZU CORPORATION, tradename: AG-50kNE). The resin member pieces 1, 2 of the laser-weakly-absorptive resin member 2 of the welded body 10 were horizontally pulled along a direction separating these at 10 mm/minute of a test speed. The result was shown in Table 2.

(Appearance Observation)

Appearances of the butted part B and the contacted parts $C_{1-2}$, $C_{2-3}$ which are welded parts of the laser-welded body 10 were visually observed. When no scorch marks and no welding scars were observed in surfaces of the laser-welded body 10, it was evaluated as "Good". When the scorch marks and the welding scars were observed therein, it was evaluated as "Bad". The result was shown in Table 2.

(Melt Flow Rate)

The laser-weakly-absorptive resin member 1 was cut to a predetermined size, and dried at 80° C. for 15 hours to prepare a measurement sample. In accordance with Japanese Industrial Standard K 7210: 2014 (Plastics-Determination of the melt mass-flow rate (MFR) and melt volume-flow rate (MVR) of thermoplastics), by using a F-F01 type melt indexer (manufactured by Toyo Seiki Seisaku-sho, Ltd., tradename), a measurement was performed under conditions of 280° C. of a test temperature and 2.16 kgf of a test load. The measurement was performed three times, and the average of obtained values was calculated to determine the melt flow rate. The melt flow rate of the laser-weakly-absorptive resin member 2 as the second resin member was 14.8 g/10 minutes.

EXAMPLE 2

(1) Preparing a Laser-Transmissible Resin Member 1

A laser-transmissible resin member 1 was prepared in the same manner as Example 1.

(2) Preparing a Laser-weakly-absorptive Resin Member 2

Each one of a resin member piece 2f and a resin member piece 2s was prepared in the same manner as Example 1 except that an amount of the polyamide 66 resin was 499.7 g and 0.3 g of Nigrosine B (nigrosine sulfate synthesized by modifying a sulfate ion concentration in accordance with the description of Japanese Patent Publication No. 3757081; sulfate ion 1.52% by mass; volume resistivity $2.7 \times 10^{10}$ Ω·cm) was used instead of Nigrosine A. The melt flow rate of the resin member pieces 2f, 2s which was obtained by measuring was 14.5 g/10 minutes.

(3) Preparing a Laser-Absorptive Resin Member 3

A laser-absorptive resin member 3 was prepared in the same manner as Example 1 except that an amount of the polyamide 66 resin was 499.5 g and 0.5 g of Nigrosine B (nigrosine sulfate; sulfate ion 1.52% by mass; volume resistivity $2.7 \times 10^{10}$ Ω·cm) was used instead of Nigrosine A.

(4) Producing a Laser-Welded Body 10

A butted part B was formed by butting and contacting ends of the both resin member pieces 2f, 2s each other. The resin member pieces 2f, 2s were used as the laser-weakly-absorptive resin member 2. A load of 400 N was applied in a butting direction of the both resin members 1, 2. The both resin members 1, 2 were fixed because a glass plate (laser beam transmittance was 90%) having 5 mm thickness was put on a face of the laser-weakly-absorptive resin member 2. A laser beam L was output from the diode laser having 10 W output power [wave length: 940 nm, continuously]. Radiation of the laser beam L was performed while scanning along the butted part B. A scan speed of the laser beam L was 0.9 mm/second and a scan distance thereof was 20 mm. The butted part B was welded and the both resin member pieces 2f, 2s were bonded. Subsequently, the laser-transmissible resin member 1, the laser-weakly-absorptive resin member 2 and the laser-absorptive resin member 3 were overlapped in this order. A three-layered resin member was prepared. The three-layered resin member received 0.4 Pa per a unit area of pressure in direction to the thickness thereof. A glass plate (laser beam transmittance was 90%) having 5 mm thickness was put on a face of the laser-transmissible resin member 1. The three-layered resin member was fixed. The laser beam L was output from the diode laser having 10 W output power [wave length: 940 nm, continuously] (manufactured by Hamamatsu Photonics K.K.). The radiation of the laser beam L was performed along the contacted parts $C_{1-2}$, $C_{2-3}$ while scanning. The scan speed of the laser beam L was 0.9 mm/second and the scan distance thereof was 20 mm. In the result, a laser-welded body 10 of Example 2 of which the respective resin members 1, 2, 3 were integrated by welding at the contacted parts $C_{1-2}$, $C_{2-3}$ was obtained. With respect to the laser-welded body 10, the evaluations were performed in the same manner as Example 1. The results were shown in Table 2.

EXAMPLE 3

(1) Preparing a Laser-Transmissible Resin Member 1

A polyamide 66 resin (available from Asahi Kasei Corp., LEONA (registered trademark) 1300S) in an amount of 498.5 g and Coloring agent A of 1.5 g were put in a tumbler made of stainless steel, followed by stirring and mixing them for 1 hour. A resin composition for a laser-transmissible resin member 1 was prepared. The resultant composition was shaped into one laser-transmissible resin member 1 having a size of 80 mm longitudinal length×50 mm lateral length×1 mm thickness in the same manner as Example 1.

(2) Preparing a Laser-Weakly-absorptive Resin Member 2

A polyamide 66 resin (available from Asahi Kasei Corp., LEONA (registered trademark) 1300S) in an amount of 498.0 g, 0.5 g of Nigrosine A and 1.5 g of Coloring agent A were put in a tumbler made of stainless steel, followed by stirring and mixing them for 1 hour. A resin composition for a laser-weakly-absorptive resin member 2 was prepared. The resultant composition was shaped into resin member pieces 2f, 2s respectively having a size of 80 mm longitudinal length×50 mm lateral length×1 mm thickness, which are to form leaser-weakly-absorptive resin member 2, in the same manner as Example 1. The melt flow rate of the resin member pieces 2f, 2s which was obtained by measuring in the same manner as in Example 1 was 15.8 g/10 minutes.

(3) Preparing a Laser-Absorptive Resin Member 3

A polyamide 66 resin (available from Asahi Kasei Corp., LEONA (registered trademark) 1300S) in an amount of 494.5 g, 4.0 g of Nigrosine A and 1.5 g of Coloring agent A were put in a tumbler made of stainless steel, followed by stirring and mixing them for 1 hour. A resin composition for a laser-absorptive resin member 3 was prepared. The resultant composition was shaped into one laser-absorptive resin member 3 having a size of 80 mm longitudinal length×50 mm lateral length×1 mm thickness in the same manner as Example 1.

(4) Producing a Laser Welded Body 10

A laser welded body 10 of Example 3 was produced in the same manner as Example 1 except that a scan speed of the laser beam L is 2.0 mm/second. With respect to the obtained laser welded body 10, the evaluations were performed in the same manner as in Example 1. The results were shown in Table 2.

Figure 4:
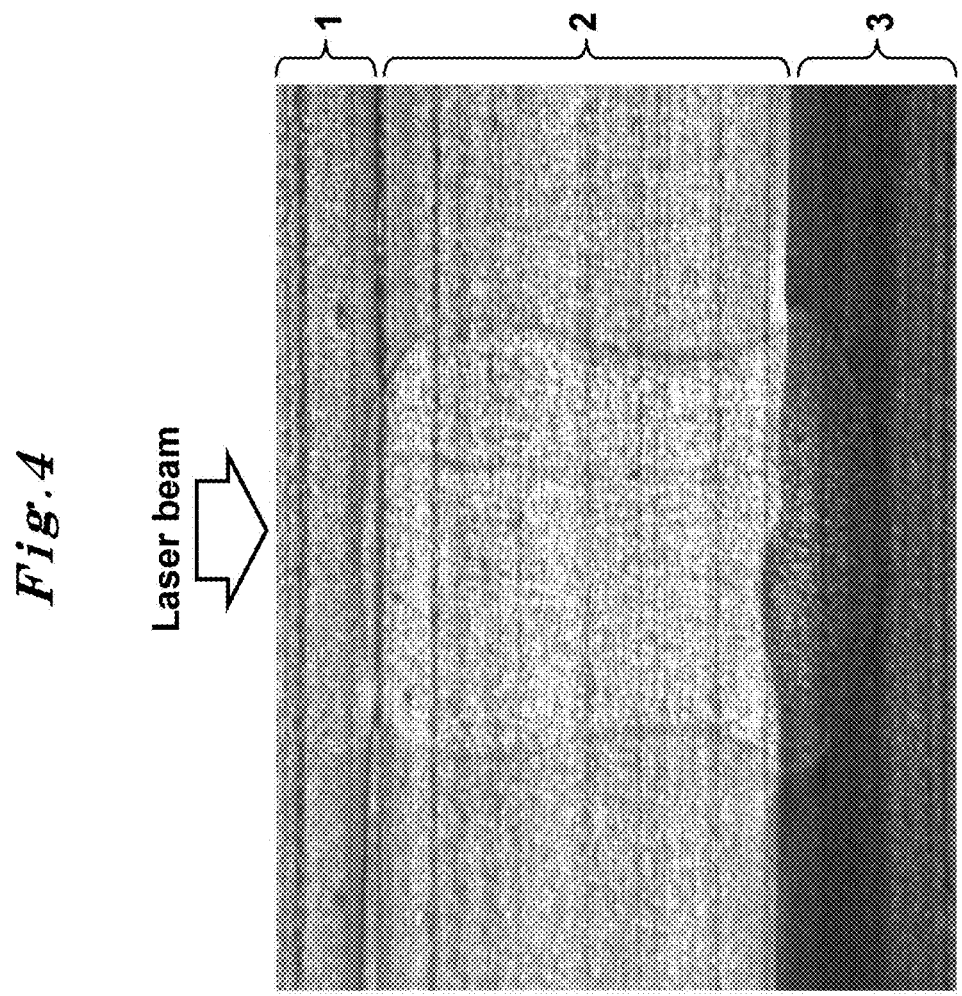
FIG. 4 is a cross sectional enlarged photograph showing a butted part and contacted parts as a welded part of a laser-welded body of Example 3 to which the present invention was applied.

A cross-sectionally enlarged photograph of a melted part of the laser welded body 10 of Example 3 is shown in FIG. 4. Incidentally, a hollow arrow therein shows a direction of radiation of the laser beam. By irradiating with the laser beam, the laser-weakly-absorptive resin member 2 is welded at the butted part. Further, the laser-weakly-absorptive resin member 2 is welded to the laser-absorptive resin member 1 located on an entering side of the laser beam and to the laser-absorptive resin member 3 at the contacted part. Thereby the laser-transmissible resin member 1, the laser-weakly-absorptive resin member 2 and the laser-absorptive resin member 3 are bonded. The contacted part between the laser-weakly-absorptive resin member 2 and the laser-absorptive resin member 3 is welded deeper and wider in comparison with the contacted part between the laser-transmissible resin member 1 and the laser-weakly-absorptive resin member 2. With respect to the laser-transmissible resin member 1 through which the laser beam was transmitted, welding scars such as scorch marks and a color change were not observed, except the contacted part with the laser-weakly-absorptive resin member 2.

EXAMPLE 4

(1) Preparing a Laser-Transmissible Resin Member 1

A laser-transmissible resin member 1 was prepared in the same manner as Example 1.

(2) Preparing a Laser-Weakly-Absorptive Resin Member 2

One resin member piece 2f and one resin member piece 2s having a size of 80 mm longitudinal length×50 mm lateral length×1 mm thickness, which are to form leaser-weakly-absorptive resin member 2, were prepared respectively in the same manner as Example 3 except that an amount of a polyamide 66 resin (available from Asahi Kasei Corp., LEONA (registered trademark) 1300S) was 497.75 g, 0.75 g of Nigrosine A and 1.5 g of Coloring agent A were used. The melt flow rate of the resin member pieces 2f, 2s which was obtained by measuring in the same manner as Example 1 was 16.2 g/10 minutes.

(3) Preparing a Laser-Absorptive Resin Member 3

A laser-absorptive resin member 3 was prepared in the same manner as Example 3.

(4) Preparing a Laser Welded Body 10

A laser welded body 10 of Example 4 was produced in the same manner as Example 3. With respect to the obtained laser welded body 10, the evaluations were performed in the same manner as in Example 1. The results were shown in Table 2.

EXAMPLE 5

(1) Preparing a Laser-Transmissible Resin Member 1

A polyamide 66 resin (available from Asahi Kasei Corp., LEONA (registered trademark) 1300S) in an amount of 499.975 g and 0.025 g of Nigrosine A were put in a tumbler made of stainless steel, followed by stirring and mixing them for 1 hour. A resin composition for a laser-transmissible resin member 1 was prepared. The resultant composition was shaped into one laser-transmissible resin member 1 having a size of 80 mm longitudinal length×50 mm lateral length×1 mm thickness in the same manner as Example 1.

(2) Preparing a Laser-Weakly-Absorptive Resin Member 2

The polyamide 66 resin (available from Asahi Kasei Corp., LEONA (registered trademark) 1300S) in an amount of 499.85 g and 0.15 g of Nigrosine A were put in a tumbler made of stainless steel, followed by stirring and mixing them for 1 hour. A resin composition for a laser-weakly-absorptive resin member 2 was prepared. The resultant resin composition was shaped into respectively one resin member piece 2f and one resin member piece 2s, which are to form laser-weakly-absorptive resin member 2, having a size of 80 mm longitudinal length×50 mm lateral length×1 mm thickness in the same manner as Example 1. The melt flow rate of the resin member pieces 2f, 2s which was obtained by measuring in the same manner as Example 1 was 13.8 g/10 minutes.

(3) Preparing a Laser-Absorptive Resin Member 3

A polyamide 66 resin (available from Asahi Kasei Corp., LEONA (registered trademark) 1300S) in an amount of 499.8 g, 0.2 g of Nigrosine A were put in a tumbler made of stainless steel, followed by stirring and mixing them for 1 hour. A resin composition for a laser-absorptive resin member 3 was prepared. The resultant composition was shaped into one laser-absorptive resin member 3 having a size of 80 mm longitudinal length×50 mm lateral length×1 mm thickness in the same manner as Example 1.

(4) Producing a Laser Welded Body 10

A laser welded body 10 of Example 5 was produced in the same manner as Example 1 except that a scan speed of the laser beam L was 0.4 mm/second. With respect to the obtained laser welded body 10, the evaluations were performed in the same manner as in Example 1. The results were shown in Table 2.

EXAMPLE 6

(1) Preparing a Laser-Transmissible Resin Member 1

A laser-transmissible resin member 1 was prepared in the same manner as Example 3.

(2) Preparing a Laser-Weakly-Absorptive Resin Member 2

Resin member pieces 2f, 2s to form a laser-weakly-absorptive resin member 2 were prepared in the same manner as Example 1.

(3) Preparing a Laser-Transmissible Resin Member 3

A laser-transmissible resin member 3 was prepared in the same manner as Example 1.

(4) Producing a Laser Welded Body 10

A laser welded body 10 of Example 6 was produced in the same manner as Example 1. With respect to the obtained laser welded body 10, the evaluations were was performed in the same manner as in Example 1. The results were shown in Table 2.

EXAMPLE 7

(1) Preparing a Laser-Transmissible Resin Member 1

A laser-transmissible resin member 1 was prepared in the same manner as Example 3 except that Coloring agent B in an amount of 1.5 g was used instead of Coloring agent A.

(2) Preparing a Laser-Weakly-Absorptive Resin Member 2

Resin member pieces 2f, 2s to form a laser-weakly-absorptive resin member 2 were prepared in the same manner as Example 1.

(3) Preparing a Laser-Absorptive Resin Member 3

A laser-absorptive resin member 3 was prepared in the same manner as Example 1.

(4) Producing a Laser Welded Body 10

A laser welded body 10 of Example 7 was produced in the same manner as Example 1. With respect to the obtained laser welded body 10, the evaluations were performed in the same manner as in Example 1. The results were shown in Table 2.

EXAMPLE 8

(1) Preparing a Laser-Transmissible Resin Member 1

A laser-transmissible resin member 1 was prepared in the same manner as Example 3 except that Coloring agent C in an amount of 1.5 g was used instead of Coloring agents A.

(2) Preparing a Laser-Weakly-Absorptive Resin Member 2

Resin member pieces 2f, 2s to form a laser-weakly-absorptive resin member 2 were prepared in the same manner as Example 1.

(3) Preparing a Laser-Absorptive Resin Member 3

A laser-absorptive resin member 3 was prepared in the same manner as Example 1.

(4) Producing a Laser Welded Body 10

A laser welded body 10 of Example 8 was produced in the same manner as Example 1. With respect to the obtained laser welded body 10, the evaluations were performed in the same manner as in Example 1. The results were shown in Table 2.

EXAMPLE 9

(1) Preparing a Laser-Transmissible Resin Member 1

A laser-transmissible resin member 1 was prepared in the same manner as Example 3 except that Coloring agent D in an amount of 1.5 g was used instead of Coloring agent A.

(2) Preparing a Laser-Weakly-Absorptive Resin Member 2

Resin member pieces 2f, 2s to form a laser-weakly-absorptive resin member 2 were prepared in the same manner as Example 1.

(3) Preparing a Laser-Absorptive Resin Member 3

A laser-absorptive resin member 3 was prepared in the same manner as Example 1.

(4) Preparing a Laser Welded Body 10

A laser welded body 10 of Example 9 was prepared in the same manner as Example 1. With respect to the obtained laser welded body 10, the evaluations were performed in the same manner as in Example 1. The results were shown in Table 2.

EXAMPLE 10

(1) Preparing a Laser-Transmissible Resin Member 1

A laser-transmissible resin member 1 was prepared in the same manner as Example 3 except that 1.5 g of a blue color salt-forming dye of an anthraquinone blue color acid dye (C.I. Acid Blue 80) and hexamethylenediamine was used instead of Coloring agent A.

(2) Preparing a Laser-Weakly-Absorptive Resin Member 2

Resin member pieces 2f, 2s to form a laser-weakly-absorptive resin member 2 were prepared in the same manner as Example 3.

(3) Preparing a Laser-Absorptive Resin Member 3

A laser-absorptive resin member 3 was prepared in the same manner as Example 3.

(4) Producing a Laser Welded Body 10

A laser welded body 10 of Example 10 was produced in the same manner as Example 3. With respect to the obtained laser welded body 10, the evaluations were performed in the same manner as in Example 1. The results were shown in Table 2.

EXAMPLE 11

(1) Preparing a Laser-Transmissible Resin Member 1

A laser-transmissible resin member 1 was prepared in the same manner as Example 3 except that an anthraquinone blue color oil soluble dye (C.I. Solvent Blue 104) in an amount of 1.5 g was used instead of Coloring agent A.

(2) Preparing a Laser-Weakly-Absorptive Resin Member 2

Resin member pieces 2f, 2s to form a laser-weakly-absorptive resin member 2 were prepared in the same manner as Example 3.

(3) Preparing a Laser-Absorptive Resin Member 3

A laser-absorptive resin member 3 was prepared in the same manner as Example 3.

(4) Producing a Laser Welded Body 10

A laser welded body 10 of Example 11 was produced in the same manner as Example 3. With respect to the obtained laser welded body 10, the evaluations were performed in the same manner as in Example 1. The results were shown in Table 2.

EXAMPLE 12

(1) Preparing a Laser-Transmissible Resin Member 1

A laser-transmissible resin member 1 was prepared in the same manner as Example 3 except that a perinone red color oil soluble dye (C.I. Solvent Red 179) in an amount of 1.5 g was used instead of Coloring agent A.

(2) Preparing a Laser-Weakly-Absorptive Resin Member 2

Resin member pieces 2f, 2s to form a laser-weakly-absorptive resin member 2 were prepared in the same manner as Example 3.

(3) Preparing a Laser-Absorptive Resin Member 3

A laser-absorptive resin member 3 was prepared in the same manner as Example 3.

(4) Producing a Laser Welded Body 10

A laser welded body 10 of Example 12 was produced in the same manner as Example 3. With respect to the obtained laser welded body 10, the evaluations were performed in the same manner as in Example 1. The results were shown in Table 2.

EXAMPLE 13

(1) Preparing a Laser-Transmissible Resin Member 1

A polyamide 66 resin (available from Asahi Kasei Corp., LEONA (registered trademark) 1300S) in an amount of 499.9 g and 0.1 g of Nigrosine A were put in a tumbler made of stainless steel, followed by stirring and mixing them for 1 hour. A resin composition for a laser-transmissible resin member 1 was prepared. The resultant composition was shaped into one laser-transmissible resin member 1 having a size of 80 mm longitudinal length×50 mm lateral length×1 mm thickness in the same manner as Example 1.

(2) Preparing a Laser-Weakly-Absorptive Resin Member 2

One resin member piece 2f and one resin member piece 2s to form leaser-weakly-absorptive resin member 2 were prepared respectively in the same manner as Example 1 except that a polyamide 66 resin (available from Asahi Kasei Corp., LEONA (registered trademark) 1300S) in an amount of 499.6 g and 0.4 g of Nigrosine A were used.

(3) Preparing a Laser-Absorptive Resin Member 3

A laser-absorptive resin member 3 was prepared in the same manner as Example 1 except that a polyamide 66 resin (available from Asahi Kasei Corp., LEONA (registered trademark) 1300S) in an amount of 499.25 g and 0.75 of Nigrosine A were used.

(4) Producing a Laser Welded Body 10

A laser welded body 10 of Example 13 was produced in the same manner as Example 1 except that a scan speed of the laser beam L is 1.0 mm/second. With respect to the obtained laser welded body 10, the evaluations were performed in the same manner as in Example 1. The results were shown in Table 2.

EXAMPLE 14

(1) Preparing a Laser-Transmissible Resin Member 1

A laser-transmissible resin member 1 was prepared in the same manner as Example 1.

(2) Preparing a Laser-Weakly-Absorptive Resin Member 2

One resin member piece 2f and one resin member piece 2s to form a leaser-weakly-absorptive resin member 2 were prepared respectively in the same manner as Example 1 except that a polyamide 66 resin (available from Asahi Kasei Corp., LEONA (registered trademark) 1300S) in an amount of 499.5 g and 0.5 g of Nigrosine A were used.

(3) Producing a Laser-Absorptive Resin Member 3

A laser-absorptive resin member 3 was produced in the same manner as Example 1 except that a polyamide 66 resin (available from Asahi Kasei Corp., LEONA (registered trademark) 1300S) in an amount of 499 g and 1.0 g of Nigrosine A were used.

(4) Producing a Laser Welded Body 10

A laser welded body 10 of Example 14 was produced in the same manner as Example 1 except that a scan speed of the laser beam L is 1.4 mm/second. With respect to the obtained laser welded body 10, the evaluations were performed in the same manner as in Example 1. The results were shown in Table 2.

EXAMPLE 15

(1) Preparing a Laser-Transmissible Resin Member 1

A laser-transmissible resin member 1 was prepared in the same manner as Example 1.

(2) Preparing a Laser-Weakly-Absorptive Resin Member 2

One resin member piece 2f and one resin member piece 2s to form a leaser-weakly-absorptive resin member 2 were prepared respectively in the same manner as Example 1 except that a polyamide 66 resin (available from Asahi Kasei Corp., LEONA (registered trademark) 1300S) in an amount of 499.25 g and 0.75 g of Nigrosine A were used. The melt flow rate of the resin member pieces 2f, 2s which was obtained by measuring in the same manner as Example 1 was 15.8 g/10 minutes.

(3) Preparing a Laser-Absorptive Resin Member 3

A laser-absorptive resin member 3 was prepared in the same manner as Example 1 except that a polyamide 66 resin (available from Asahi Kasei Corp., LEONA (registered trademark) 1300S) in an amount of 498 g and 2.0 g of Nigrosine A were used.

(4) Producing a Laser Welded Body 10

A laser welded body 10 of Example 15 was produced in the same manner as Example 1 except that a scan speed of the laser beam L is 1.4 mm/second. With respect to the obtained laser welded body 10, the evaluations were performed in the same manner as in Example 1. The results were shown in Table 2.

EXAMPLE 16

(1) Preparing a Laser-Transmissible Resin Member 1, a Laser-Weakly-Absorptive Resin Member 2 and a Laser-absorptive Resin Member 3

A laser-transmissible resin member 1, a laser-weakly-absorptive resin member 2 and a laser-absorptive resin member 3 were prepared in the same manner as Example 15.

(2) Producing a Laser Welded Body 10

A laser welded body 10 of Example 16 was produced in the same manner as Example 15 except that a scan speed of the laser beam L was 2.0 mm/second. With respect to the obtained laser welded body 10, the evaluations were performed in the same manner as in Example 1. The results were shown in Table 2.

EXAMPLE 17

(1) Preparing a Laser-Transmissible Resin Member 1

A laser-transmissible resin member 1 was prepared in the same manner as Example 1.

(2) Preparing a Laser-Weakly-Absorptive Resin Member 2

One resin member piece 2f and one resin member piece 2s to form a leaser-weakly-absorptive resin member 2 were prepared respectively in the same manner as Example 1 except that a polyamide 66 resin (available from Asahi Kasei Corp., LEONA (registered trademark) 1300S) in an amount of 499.5 g and 0.5 g of Nigrosine A were used. The melt flow rate of the resin member pieces 2f, 2s which was obtained by measuring in the same manner as Example 1 was 15.3 g/10 minutes.

(3) Preparing a Laser-Absorptive Resin Member 3

A laser-absorptive resin member 3 was prepared in the same manner as Example 1 except that an amount of a polyamide 66 resin (available from Asahi Kasei Corp., LEONA (registered trademark) 1300S) was 497 g and 3.0 g of Nigrosine A were used.

(4) Producing a Laser Welded Body 10

A laser welded body 10 of Example 17 was produced in the same manner as Example 1 except that a scan speed of the laser beam L was 1.4 mm/second. With respect to the obtained laser welded body 10, the evaluations were performed in the same manner as in Example 1. The results were shown in Table 2.

EXAMPLE 18

(1) Preparing a Laser-Transmissible Resin Member 1

A laser-transmissible resin member 1 was prepared in the same manner as Example 1.

(2) Preparing a Laser-Weakly-Absorptive Resin Member 2

One resin member piece 2f and one resin member piece 2s to form a leaser-weakly-absorptive resin member 2 were prepared respectively in the same manner as Example 1 except that a polyamide 66 resin (available from Asahi Kasei Corp., LEONA (registered trademark) 1300S) in an amount of 499.25 g and 0.75 g of Nigrosine A were used. The melt flow rate of the resin member pieces 2f, 2s which was obtained by measuring in the same manner as Example 1 was 15.8 g/10 minutes.

(3) Preparing a Laser-Absorptive Resin Member 3

A laser-absorptive resin member 3 was prepared in the same manner as Example 1 except that a polyamide 66 resin (available from Asahi Kasei Corp., LEONA (registered trademark) 1300S) in an amount of 497 g and 3.0 g of Nigrosine A were used.

(4) Producing a Laser Welded Body 10

A laser welded body 10 of Example 18 was produced in the same manner as Example 1 except that a scan speed of the laser beam L is 2.0 mm/second. With respect to the obtained laser welded body 10, the evaluations were performed in the same manner as in Example 1. The results were shown in Table 2.

COMPARATIVE EXAMPLE 1

A polyamide 66 resin in an amount of 499.5 g and 0.5 g of Nigrosine A (the nigrosine sulfate; sulfate ion 1.96% by mass; volume resistivity $2.0 \times 10^{10}$ Ω·cm) were put in a tumbler made of stainless steel, followed by stirring and mixing them for 1 hour. A resin composition was prepared. The resultant resin composition was shaped into two resin member pieces having a size of 80 mm longitudinal length× 50 mm lateral length×1 mm thickness in the usual manner at 290° C. of a cylinder temperature and 80° C. of a mold temperature by using an injection molding machine. Ends of the resin member pieces were butted and contacted each other. A load of 400 N was applied in a butting direction of the both resin members. The both resin members were fixed because a glass plate (laser beam transmittance was 90%) having 5 mm thickness was put on a face of the both resin members so as to bridge these. A laser beam radiated along the butted part while scanning at a scan speed of 1 mm/second and a scan distance of 20 mm. The both resin members were bonded by welding the butted part. A comparative laser-welded body of Comparative example was obtained. The evaluations with respect to the comparative laser-welded body were performed in the same manner as Example 1. The comparative laser-welded body had welding scars. A result was shown in Table 2.

COMPARATIVE EXAMPLE 2

Respective resin members and resin member pieces were prepared in the same manner as Example 5 except that 499.8 g of a polyamide 66 resin and 0.2 g of Nigrosine A which were contained in a resin composition for a laser-transmissible resin member were used, 499.5 g of the polyamide 66 resin and 0.5 g of Nigrosine A which were contained in a resin composition for a laser-weakly-absorptive resin member were used and 498.0 g of the polyamide 66 resin and 2.0 g of Nigrosine A which were contained in a resin composition for a laser-absorptive resin member were used. A laser beam was used on a layered body prepared by butting and overlapping these in the same manner as Example 5 except that scan speed was 3.0 mm/second. But a laser-welded body was not obtained because the resin members could not be welded. The absorbances of the respective resin members in Comparative example 2 were shown in Table 2.

COMPARATIVE EXAMPLE 3

Respective resin members and resin member pieces were prepared in the same manner as Example 5 except that 499.7 g of a polyamide 66 resin and 0.3 g of Nigrosine A which were contained in a resin composition for a laser-transmissible resin member were used, 499.25 g of the polyamide 66 resin and 0.75 g of Nigrosine A which were contained in a resin composition for a laser-weakly-absorptive resin member were used and 498.0 g of the polyamide 66 resin and 2.0 g of Nigrosine A which were contained in a resin composition for a laser-absorptive resin member were used. A laser beam was used on a layered body prepared by butting and overlapping these in the same manner as Example 5 except that scan speed was 2.0 mm/second. But a laser-welded body was not obtained because the resin members could not be welded. The absorbances of the respective resin members in Comparative example 3 were shown in Table 2.

COMPARATIVE EXAMPLE 4

Each of a laser-transmissible resin member 1, and a resin member piece 2f and a resin member piece 2s used as a laser-weakly-absorptive resin member 2 were prepared one by one. One of a laser-absorptive resin member 3 was prepared in the same manner as Example 1 except that a polyamide 66 resin (available from Asahi Kasei Corp., LEONA (registered trademark) 1300S) in an amount of 494.2 g and 5.8 g of Nigrosine A were used. A comparative laser-welded body of Comparative example 4 was obtained in the same manner as Example 1 except that a scan speed of a laser beam L was 1.4 mm/second. The evaluations with respect to the comparative laser-welded body were performed in the same manner as Example 1. A result was shown in Table 2.

TABLE 2

|  | Absorbance $a_1$ | Absorbance $a_2$ | Absorbance $a_3$ | Scan speed (mm/sec.) | Tensile strength (N) | Appearance observation |
|---|---|---|---|---|---|---|
| Example 1 | 0.05 | 0.24 | 0.36 | 0.6 | 943 | Good |
| Example 2 | 0.05 | 0.37 | 0.53 | 0.9 | 1006 | Good |
| Example 3 | 0.06 | 0.54 | 3.69 | 2 | 1007 | Good |
| Example 4 | 0.05 | 0.75 | 3.69 | 2 | 939 | Good |
| Example 5 | 0.08 | 0.18 | 0.24 | 0.4 | 1011 | Good |
| Example 6 | 0.06 | 0.24 | 0.36 | 0.6 | 945 | Good |
| Example 7 | 0.06 | 0.24 | 0.36 | 0.6 | 942 | Good |
| Example 8 | 0.06 | 0.24 | 0.36 | 0.6 | 947 | Good |
| Example 9 | 0.06 | 0.24 | 0.36 | 0.6 | 946 | Good |
| Example 10 | 0.06 | 0.54 | 3.69 | 2 | 1005 | Good |
| Example 11 | 0.06 | 0.54 | 3.69 | 2 | 1002 | Good |
| Example 12 | 0.06 | 0.54 | 3.69 | 2 | 1005 | Good |
| Example 13 | 0.12 | 0.45 | 0.74 | 1 | 959 | Good |
| Example 14 | 0.05 | 0.53 | 0.94 | 1.4 | 1072 | Good |
| Example 15 | 0.05 | 0.74 | 1.89 | 1.4 | 1058 | Good |
| Example 16 | 0.05 | 0.74 | 1.89 | 2 | 1012 | Good |
| Example 17 | 0.05 | 0.53 | 2.91 | 1.4 | 1101 | Good |
| Example 18 | 0.05 | 0.74 | 2.91 | 2 | 1088 | Good |
| Com. exam. 1 |  | 0.53 |  | 1 | 612 | Bad |
| Com. exam. 2 | 0.24 | 0.53 | 1.87 | 3 | — | — |
| Com. exam. 3 | 0.36 | 0.74 | 1.87 | 2 | — | — |
| Com. exam. 4 | 0.05 | 0.24 | 5.35 | 1.4 | 573 | Bad (Scorch) |

As can be clear from Table 2, the lase-welded body 10 of any Examples 1 to 18 had the high tensile strength because the butted part b and the contacted parts $C_{1-2}$, $C_{2-3}$ were tightly welded. In contrast, Comparative example 1 exhibited the low tensile strength compared to the lase-welded body 10 of Examples because the only butted part was welded and resin members were not overlapped. In comparative examples 2 and 3, the three-layered resin members could not be welded because the laser beam could not passed therethrough due to the high absorbance $a_1$ of 0.24 and 0.36, respectively. In Comparative example 4, the scorch marks were incurred between the laser-weakly-absorptive resin member and the laser-absorptive resin member.

INDUSTRIAL APPLICABILITY

As uses of the laser-welded body of the present invention, various automobiles and vehicle parts, electric and electronic parts, building, packaging materials, parts relative to livingware and the like; products requiring airtightness such as various containers and tanks, various pipelines, various valves, various motors, various bottles and the like. For example, the laser-welded body of the present invention has greatly high applicability in industry because the laser-welded body thereof is suitably and extensively apply to parts for transportation equipment (especially automobile) such as an instrument panel used for an interior, a resonator (muffler) in an engine compartment, a head cover for an engine, a drive system, a brake system, a lighting assembly for vehicle; an electric component; parts for electric and electronic equipment; parts for an industrial machine; a tube used for infusion of transfusion and nutritive solution; a packing material for a food product such as a spout pouch putting a liquid food product and a beverage composition; a label for a PET bottle; and parts for household electrical goods such as a housing.

EXPLANATION OF LETTERS OR NUMERALS

Numerals mean as follows. 1: laser-transmissible resin member, 2: laser-weakly-absorptive resin member, 2f, 2s: resin member piece, 3: laser-absorptive resin member, 10: laser-welded body, B, $B_1$, $B_2$: butted part, $C_{1-2}$, $C_{2-3}$: contacted part, L: laser beam

What is claimed is:

1. A laser-welded body comprising:
   at least three of resin members, which contain a thermoplastic resin, comprising:
   a first resin member which is a laser-irradiated subject, has an absorbance $a_1$ of 0.01 to 0.12;
   a second resin member which has an absorbance $a_2$ of 0.1 to 0.9 and includes two or more resin member pieces, the ends of which are brought into contact and form a butted part between adjacent member pieces; and
   a third resin member which has an absorbance $a_3$ of 0.2 to 3.8,
   and the absorbances $a_2$, $a_3$ exhibited by the second resin member and the third resin member are attributed to the inclusion of nigrosine sulfate as a laser beam absorbent therein,
   the resin members are overlapped in the order mentioned to form contacted parts at these interfaces, at least a part of the butted part(s) and the contacted parts are laser-welded together,
   the thermoplastic resin is at least one selected from the group consisting of a polyamide resin, a polycarbonate resin, a polyphenylene sulfide resin, a polyethylene terephthalate resin, a polybutylene terephthalate resin and a polypropylene resin,
   a tensile strength obtained by horizontally pulling the second resin member along a direction separating the butted part is at least 942 N, and
   the absorbances $a_1$, $a_2$ and $a_3$ are with respect to a laser beam having a wavelength region of 940 nm which is output from a semiconductor laser.

2. The laser-welded body according to claim 1, wherein a volume resistivity of the nigrosine sulfate is $3.0 \times 10^9$ to $1.0 \times 10^{11}$ Ω·cm.

3. The laser-welded body according to claim 1, wherein a concentration of the nigrosine sulfate is 0.3 to 5% by mass.

4. The laser-welded body according to claim 1, wherein a melt flow rate of the second resin member is 11 to 30 g/10 minutes.

5. The laser-welded body according to claim 1, wherein the second resin member includes two resin member pieces having absorbances $a_{2f}$ and $a_{2s}$ respectively, and an absorbance ratio $a_{2f}/a_{2s}$ of the absorbance $a_{2f}$ to the absorbance $a_{2s}$ is 0.3 to 1.2.

6. The laser-welded body according to claim 1, wherein the absorbance $a_1$ is 0.01 to 0.09.

7. The laser-welded body according to claim 1, wherein the first resin member contains an anthraquinone dye.

8. A production method for a laser-welded body comprising according to claim 1:

overlapping at least three of a first resin member having an absorbance $a_1$ of 0.01 to 0.12, a second resin member having a butted part where ends of one or more resin members which have an absorbance $a_2$ of 0.1 to 0.9 are brought into contact with each other and a third resin member having an absorbance $a_3$ of 0.2 to 3.8 to form contacted parts at these interfaces and irradiating the butted part and/or the contacted parts with a laser beam from a side of the first resin member to weld at least a part of the butted part and/or the contacted parts, wherein a thermoplastic resin which is contained in the first resin member, the second resin member and the third resin member is at least one selected from the group consisting of a polyamide resin, a polycarbonate resin, a polyphenylene sulfide resin, a polyethylene terephthalate resin, a polybutylene terephthalate resin and a polypropylene resin, and the absorbances $a_2$, $a_3$ exhibited by the second resin member and the third resin member are attributed to the inclusion of nigrosine as a laser beam absorbent therein.

9. The laser-welded body according to claim 2, wherein the first resin member contains an anthraquinone dye.

10. The laser-welded body according to claim 3, wherein the first resin member contains an anthraquinone dye.

11. The laser-welded body according to claim 4, wherein the first resin member contains an anthraquinone dye.

12. The laser-welded body according to claim 5, wherein the first resin member contains an anthraquinone dye.

* * * * *